(12) United States Patent
Labib et al.

(10) Patent No.: US 12,404,098 B1
(45) Date of Patent: Sep. 2, 2025

(54) LOAD HANDLING SYSTEM FOR STORAGE RACKING

(71) Applicant: SIMPL Automation Inc., Waltham, MA (US)

(72) Inventors: Ayman Labib, Waltham, MA (US); Nicholas Gordon, Rochester, NY (US); Daniel Mitus, Middleton, MA (US); Stephen Nilsen, Nashville, TN (US)

(73) Assignee: SIMPL AUTOMATION INC., Waltham, MA (US)

( * ) Notice: Subject to any disclaimer, the term of this patent is extended or adjusted under 35 U.S.C. 154(b) by 0 days.

(21) Appl. No.: 19/211,023

(22) Filed: May 16, 2025

Related U.S. Application Data

(62) Division of application No. 18/917,863, filed on Oct. 16, 2024.

(Continued)

(51) Int. Cl.
*B65G 1/04* (2006.01)

(52) U.S. Cl.
CPC .... *B65G 1/0435* (2013.01); *B65G 2203/0233* (2013.01)

(58) Field of Classification Search
CPC ...... B65G 1/0435; B65G 1/0407; B65G 1/02; B65G 2207/00
See application file for complete search history.

(56) References Cited

U.S. PATENT DOCUMENTS

| | | | |
|---|---|---|---|
| 3,782,565 A | * | 1/1974 | Doran .................. B65G 1/0435 318/605 |
| 3,840,131 A | * | 10/1974 | Castaldi ................. B66F 9/072 414/281 |

(Continued)

FOREIGN PATENT DOCUMENTS

| | | |
|---|---|---|
| CN | 113830485 B | 1/2023 |
| CN | 115649730 A | 1/2023 |

(Continued)

OTHER PUBLICATIONS

YouTube Video by Zhejiang Libiao Robots Co., Ltd., Libiao Robotics Introduction, YouTube, Apr. 2023, https://www.youtube.com/watch?v=DS2GoPq1cY8.

(Continued)

*Primary Examiner* — Kaitlin S Joerger
(74) *Attorney, Agent, or Firm* — VLP Law Group LLP; Michel Bohn

(57) ABSTRACT

A load handling system for storage racking includes a first bracket assembly for coupling a first horizontal guide rail to the storage racking, featuring a first racking column adapter with a column connection portion for attachment to a racking column and a support member extending perpendicularly. A first horizontal guide rail support device is coupled to the support member to secure the guide rail. A second bracket assembly similarly couples a second horizontal guide rail, with a second racking column adapter and a second guide rail support device. A vertical guide rail assembly, coupled to both horizontal guide rails, is horizontally movable along them via a first motor. A load handling platform, attached to the vertical guide rail assembly, is vertically movable along the vertical guide rail assembly by a second motor, facilitating efficient load handling within the storage racking system.

20 Claims, 23 Drawing Sheets

Related U.S. Application Data

(60) Provisional application No. 63/563,970, filed on Mar. 12, 2024, provisional application No. 63/590,702, filed on Oct. 16, 2023.

(56) References Cited

U.S. PATENT DOCUMENTS

| | | | | |
|---|---|---|---|---|
| 4,113,119 | A * | 9/1978 | Brown | B65G 1/0407 |
| | | | | 414/281 |
| 4,286,911 | A * | 9/1981 | Benjamin | B65G 1/0414 |
| | | | | 191/1 R |
| 2006/0285948 | A1 * | 12/2006 | Tsujimoto | B65G 1/0407 |
| | | | | 414/279 |
| 2009/0028675 | A1 * | 1/2009 | Tsujimoto | B65G 1/0407 |
| | | | | 414/273 |
| 2013/0216337 | A1 * | 8/2013 | Rafols | B65G 1/0407 |
| | | | | 414/279 |
| 2018/0201443 | A1 * | 7/2018 | Yamagishi | B65G 1/0435 |
| 2020/0231419 | A1 * | 7/2020 | Kalm | B66F 9/07 |
| 2021/0309457 | A1 * | 10/2021 | Tsuji | B65G 1/0421 |

FOREIGN PATENT DOCUMENTS

| | | |
|---|---|---|
| CN | 113830486 B | 4/2023 |
| CN | 218940272 U | 4/2023 |
| CN | 113830487 B | 6/2023 |
| CN | 116354016 A | 6/2023 |
| CN | 116119241 B | 7/2023 |
| WO | 2023045398 A1 | 3/2023 |

OTHER PUBLICATIONS

YouTube Video by Nanjing Inform Storage Equipment Group Co., Ltd., Attic Shuttle in Action, YouTube, Apr. 2021, https://www.youtube.com/watch?v=MycK2Mnl--A.

YouTube Video by Nanjing Inform Storage Equipment Group Co., Ltd., Attic Shuttle Operation, YouTube, https://www.youtube.com/watch?v=tmVQxwQ1obg.

YouTube Video by Новейшие Техологии ЛС, Spyder Performance Demo, YouTube, Oct. 2017, https://www.youtube.com/watch?v=IXhhmgx7iyw.

YouTube Video by Новейшие Техологии ЛС, Spyder Maneuverability, YouTube, https://www.youtube.com/watch?v=OrtF44sOl9M.

YouTube Video by Новейшие Техологии ЛС, Spyder Maneuverability, https://www.youtube.com/watch?v=haqoQkr9EhM.

YouTube Video by Storojet, Storojets' Operations Overview, YouTube, https://www.youtube.com/watch?v=yo8jHBsxwl0.

YouTube Channel by i-Collector System, i-Collector System Solutions, Horizontal Spyders, YouTube, Mar. 2014, https://www.youtube.com/@icollectorsystem/videos.

Youtube video by unknown content creator, Ladder-Like Solutions Demo, YouTube, Mar. 2021, https://www.youtube.com/watch?v=ckHnvWqXG8E.

YouTube Videos on Pharmaceutical Solutions, Robotic Handling for Pharma Industry, YouTube, https://www.youtube.com/watch?v=fh7PWFHsEHk.

* cited by examiner

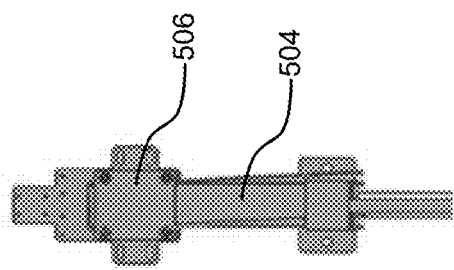
Figure 6
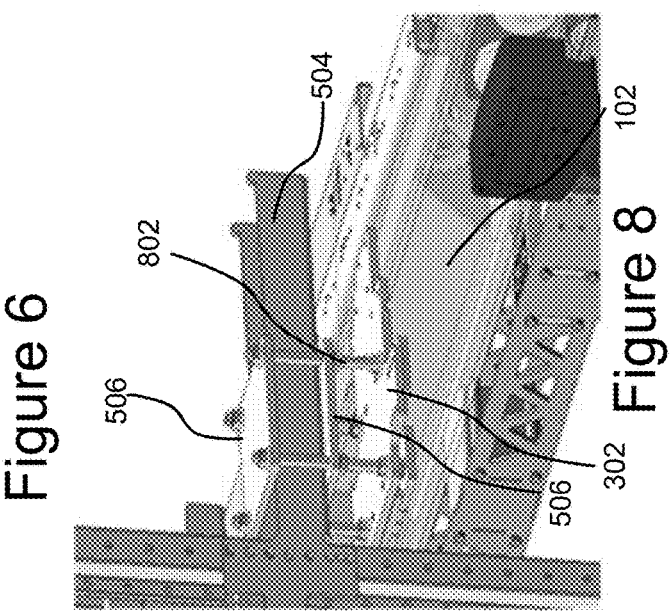
Figure 8
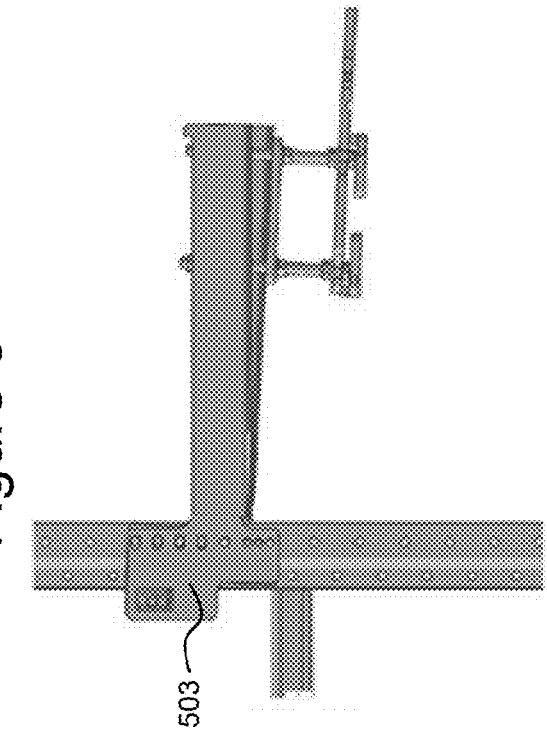
Figure 5
Figure 7

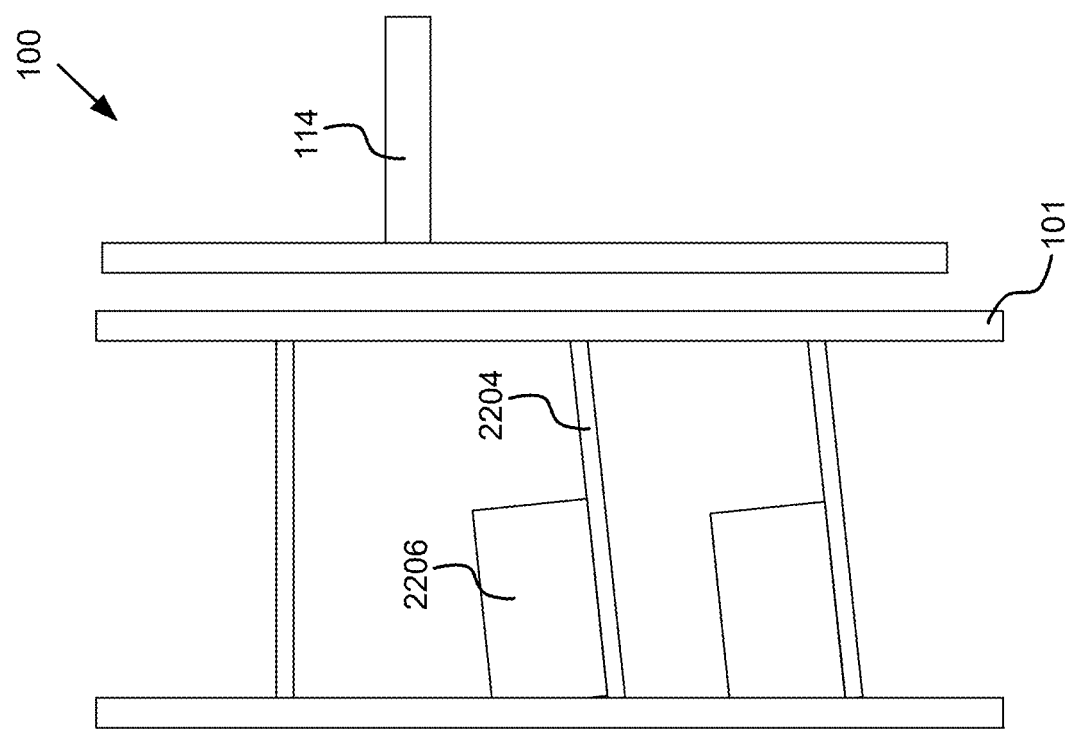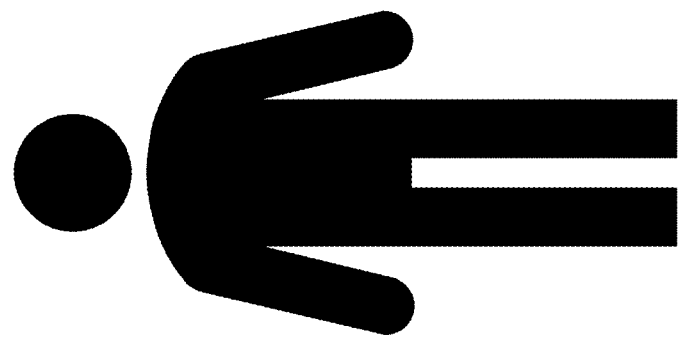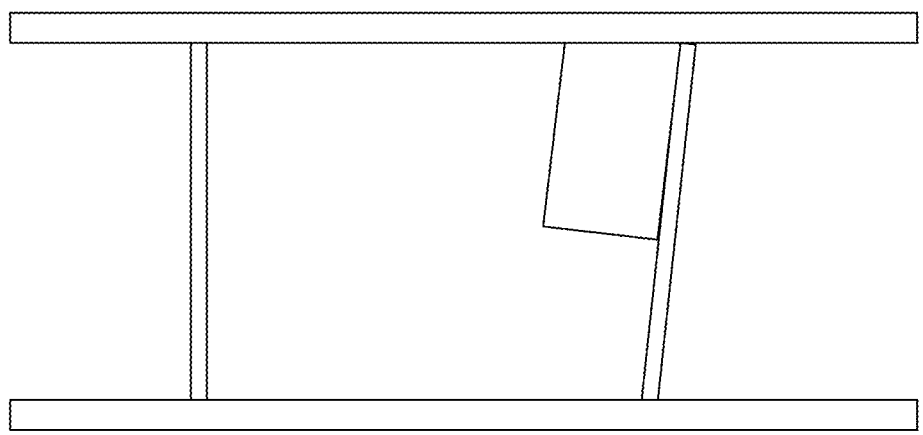
Figure 22

LOAD HANDLING SYSTEM FOR STORAGE RACKING

CROSS REFERENCE TO RELATED APPLICATIONS

This application is a divisional of U.S. patent application Ser. No. 18/917,863, filed Oct. 16, 2024, which claims priority under 35 U.S.C. § 119(e) to U.S. Provisional Patent Application No. 63/590,702, filed Oct. 16, 2023 and titled "Modularized Rack Storage System" and U.S. Provisional Patent Application No. 63/563,970, filed Mar. 12, 2024 and titled "Modularized Rack Storage System", each of which is incorporated herein by reference in its entirety.

BACKGROUND

At present, the logistics industry is developing rapidly, and the degree of automation is becoming increasingly important and advanced. Coupled with the increase in the frequency of various e-commerce promotional activities, it is difficult for the current warehousing situation to remain in a relatively stable state like the traditional business era, and it is necessary to frequently adjust the warehousing scale according to the number of orders generated by e-commerce promotions. At the same time, customers' needs for warehousing are also different. Some customers are cost-oriented and willing to sacrifice some warehousing efficiency, while some customers are efficiency-oriented and willing to relax cost requirements. At the same time, due to the different storage spaces of customers, it is difficult to unify the size specifications of all storage shelves. If customized for each customer's needs, although the needs of most customers can be solved, the high cost of customization and molding are unacceptable to logistics and warehousing suppliers.

SUMMARY

In some aspects, the techniques described herein relate to a load handling system for storage racking, the load handling system including: a first bracket assembly configured to couple a first horizontal guide rail with the storage racking, wherein the first bracket assembly includes: a first racking column adapter having a first column connection portion, wherein the first column connection portion is configured to attach to a column of the storage racking, and a first support member extending substantially perpendicularly from the first column connection portion; and a first horizontal guide rail support device coupled with the first support member, wherein the first horizontal guide rail support device is configured to secure the first horizontal guide rail; a second bracket assembly configured to couple a second horizontal guide rail with the storage racking, wherein the second bracket assembly includes: a second racking column adapter configured to attach to the column of the storage racking; and a second horizontal guide rail support device coupled with the second racking column adapter, wherein the second horizontal guide rail support device is configured to secure the second horizontal guide rail; a vertical guide rail assembly coupled with the first horizontal guide rail and the second horizontal guide rail, wherein the vertical guide rail assembly is configured to be moved horizontally along the first horizontal guide rail and the second horizontal guide rail by a first motor; and a load handling platform coupled with the vertical guide rail assembly, wherein the load handling platform is configured to be moved vertically along the vertical guide rail assembly by a second motor.

In some aspects, the techniques described herein relate to a load handling system, wherein the first horizontal guide rail support device includes: a guide rail support plate coupled with the first support member; and a plurality of pressure plates coupled with the guide rail support plate; wherein the first horizontal guide rail is configured to be secured between the guide rail support plate and the plurality of pressure plates.

In some aspects, the techniques described herein relate to a load handling system, wherein the guide rail support plate is further configured to support a first gear rack, wherein a first pinion gear coupled with the first motor is configured to interface with the first gear rack to move the vertical guide rail assembly horizontally along the first horizontal guide rail.

In some aspects, the techniques described herein relate to a load handling system, wherein the first bracket assembly is configured to enable adjustment of an angle of the first support member with respect to the column of the storage racking to account for variability in columns of the storage racking.

In some aspects, the techniques described herein relate to a load handling system, wherein the second bracket assembly is configured to enable adjustment of an angle of the second horizontal guide rail support device with respect to the column of the storage racking to account for variability in columns of the storage racking.

In some aspects, the techniques described herein relate to a load handling system, wherein the first bracket assembly is configured to enable adjustment of a distance between the column of the storage racking and the first horizontal guide rail support device to account for variability in columns of the storage racking.

In some aspects, the techniques described herein relate to a load handling system, wherein the second bracket assembly is configured to enable adjustment of a distance between the column of the storage racking and the second horizontal guide rail support device to account for variability in columns of the storage racking.

In some aspects, the techniques described herein relate to a load handling system for storage racking, the load handling system including: a plurality of adjustable bracket assemblies coupled with a column of the storage racking, each adjustable bracket assembly of the plurality of adjustable bracket assemblies including: a column adapter extending substantially perpendicularly from the column of the storage racking; and a horizontal guide rail support coupled with the column adapter; a plurality of horizontal guide rails coupled with the plurality of horizontal guide rail supports; a vertical guide rail assembly slidably coupled with the plurality of horizontal guide rails, wherein the vertical guide rail assembly is motorized to move horizontally along the plurality of horizontal guide rails; a load handling platform slidably coupled with the vertical guide rail assembly, wherein the load handling platform is motorized to move vertically along the vertical guide rail assembly; and a load handling device, wherein the load handling platform is configured to deliver the load handling device to manipulate a load located in the storage racking.

In some aspects, the techniques described herein relate to a load handling system, wherein the plurality of adjustable bracket assemblies are configured to enable adjustment of yaw, pitch, and roll of the plurality of adjustable bracket assemblies such that the plurality of horizontal guide rails are level and straight regardless of variability in column position of the storage racking.

In some aspects, the techniques described herein relate to a load handling system, wherein the plurality of adjustable bracket assemblies include: an adjustable upper bracket assembly coupled with the column of the storage racking; and an adjustable lower bracket assembly coupled with the column of the storage racking.

In some aspects, the techniques described herein relate to a load handling system, wherein the adjustable upper bracket assembly includes: an adjustable column adapter including: a column connection portion, wherein the column connection portion is configured to adjustably attach to the column of the storage racking; and a support member extending substantially perpendicularly from the column connection portion; and a horizontal guide rail support device coupled with the support member, wherein the horizontal guide rail support device is configured to adjustably secure a horizontal guide rail.

In some aspects, the techniques described herein relate to a load handling system, wherein the horizontal guide rail support device includes: a guide rail support plate coupled with the support member; and a plurality of pressure plates coupled with the guide rail support plate, wherein the horizontal guide rail is configured to be secured between the guide rail support plate and the plurality of pressure plates.

In some aspects, the techniques described herein relate to a load handling system, wherein the guide rail support plate is further configured to support a gear rack, wherein the gear rack is configured to interface with a motor of the vertical guide rail assembly to move the vertical guide rail assembly horizontally along the horizontal guide rail.

In some aspects, the techniques described herein relate to a load handling system, wherein the adjustable lower bracket assembly includes: an adjustable column adapter configured to adjustably attach to the column of the storage racking; and an adjustable horizontal guide rail support coupled with a distal end of the adjustable column adapter, wherein the horizontal guide rail support is configured to support a horizontal guide rail.

In some aspects, the techniques described herein relate to a load handling system, wherein the horizontal guide rail includes a gear rack, wherein the gear rack is configured to interface with a motor of the vertical guide rail assembly to move the vertical guide rail assembly horizontally along the horizontal guide rail.

In some aspects, the techniques described herein relate to a load handling system for storage racking, the load handling system including: means for adjustably coupling an upper horizontal guide rail with the storage racking; means for adjustably coupling a lower horizontal guide rail with the storage racking; a vertical guide rail assembly slidably coupled with the upper horizontal guide rail and the lower horizontal guide rail, wherein the vertical guide rail assembly is motorized to move horizontally along the upper horizontal guide rail and the lower horizontal guide rail; a load handling platform slidably coupled with the vertical guide rail assembly, wherein the load handling platform is motorized to move vertically along the vertical guide rail assembly; and load handling means, wherein the load handling platform is configured to deliver the load handling means to manipulate a load located in the storage racking.

In some aspects, the techniques described herein relate to a load handling system, wherein the means for adjustably coupling the upper horizontal guide rail with the storage racking is configured to enable adjustment of pitch, yaw, and roll such that the upper horizontal guide rail are level and straight regardless of variability in column position of the storage racking.

In some aspects, the techniques described herein relate to a load handling system, wherein the means for adjustably coupling the lower horizontal guide rail with the storage racking is configured to enable adjustment of pitch, yaw, and roll such that the lower horizontal guide rail are level and straight regardless of variability in column position of the storage racking.

In some aspects, the techniques described herein relate to a load handling system, wherein the means for adjustably coupling the upper horizontal guide rail with the storage racking is configured to enable adjustment of a distance between the storage racking and the upper horizontal guide rail to account for variability in columns of the storage racking.

In some aspects, the techniques described herein relate to a load handling system, wherein the means for adjustably coupling the lower horizontal guide rail with the storage racking is configured to enable adjustment of a distance between the storage racking and the lower horizontal guide rail to account for variability in columns of the storage racking.

However, this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

FIG. 5 depicts an example of an upper bracket assembly for attaching a load handling system to storage racking.

FIG. 6 is a top view of upper bracket assembly and depicts the angular adjustability of the upper bracket assembly in the horizontal direction parallel to the face of storage racking.

FIG. 7 is a side view of upper bracket assembly and depicts the angular adjustability of the upper bracket assembly in the vertical direction.

FIG. 8 depicts the linear adjustability of the upper bracket assembly in the vertical direction.

FIG. 22 is a line drawing of an example workstation in a load handling system.

DETAILED DESCRIPTION

The technology described in this disclosure relates to load handling in a warehouse or similar storage environment where vertical storage racking is employed and particularly to environments where dense storage solutions are employed. As an example, the technology provides for automated and efficient retrieval and replacement of loads in the storage racking in a dense, multi-deep storage system.

Figure 1:
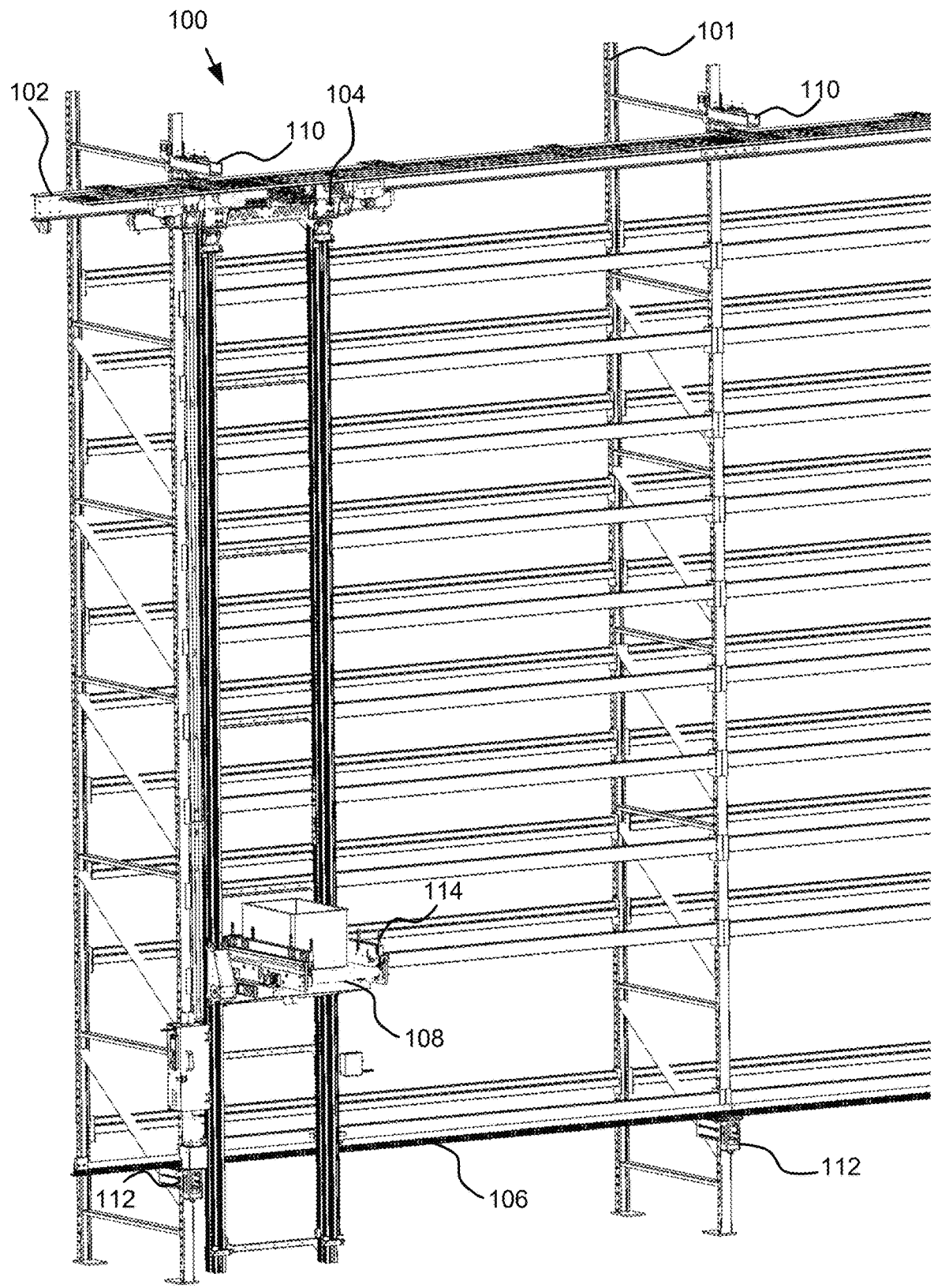
FIG. 1 depicts an example load handling system attached to storage racking.

FIG. 1 depicts an example load handling system 100 attached to storage racking 101. The load handling system 100 is designed to be universally compatible with a wide variety of storage racking systems. The load handling system 100 includes an upper horizontal guide rail 102, a vertical guide rail assembly 104, a lower horizontal guide rail 106, a load handling platform 108, and load handling device 114. The upper horizontal guide rail 102 is connected to the storage racking 101 by upper bracket assembly 110. The lower horizontal guide rail 106 is connected to the storage racking 101 by lower bracket assemblies 112. The upper bracket assembly 110 and lower bracket assembly 112, as described in more detail below, are designed to be adjustable in three dimensions to allow for variations in the storage racking 101 while maintaining the upper horizontal guide rail 102 and lower horizontal guide rail 106 in a straight and stable position to allow the vertical guide rail assembly 104 to travel freely along the upper horizontal guide rail 102 and the lower horizontal guide rail 106.

The vertical guide rail assembly 104 connects to, and travels horizontally along, upper horizontal guide rail 102 and lower horizontal guide rail 106. Load handling platform 108 connects to, and travels vertically along, the rails of the vertical guide rail assembly 104. The horizontal movement of the vertical guide rail assembly 104 and the vertical movement of the load handling platform 108 allows the load handling device 114 to access and manipulate loads from any position in the storage racking 101. While the loads depicted in the examples throughout the figures are totes, it should be noted that the load handling device 114 may be adapted to handle various types of loads or objects including, but not limited to, totes, trays, boxes, cartons, pallets, etc.

While the example of FIG. 1 depicts a single load handling platform 108 and load handling device 114 coupled with vertical guide rail assembly 104, it should be appreciated that each vertical guide rail assembly 104 in load handling system 100 can accommodate multiple load handling platforms and/or load handling devices. For example, storage racking may be divided into two or more vertical zones, each with one or more load handling platforms and/or load handling devices deployed to service a vertical zone. In another embodiment, a first load handling device can remove and hold a first load from storage racking so a second load handling device on the same vertical guide rail assembly can access a second load that was stored behind the first load. It should be apparent that any number of load handling platforms and/or load handling devices can be used to access loads stored deeper in the storage racking.

Figure 2:
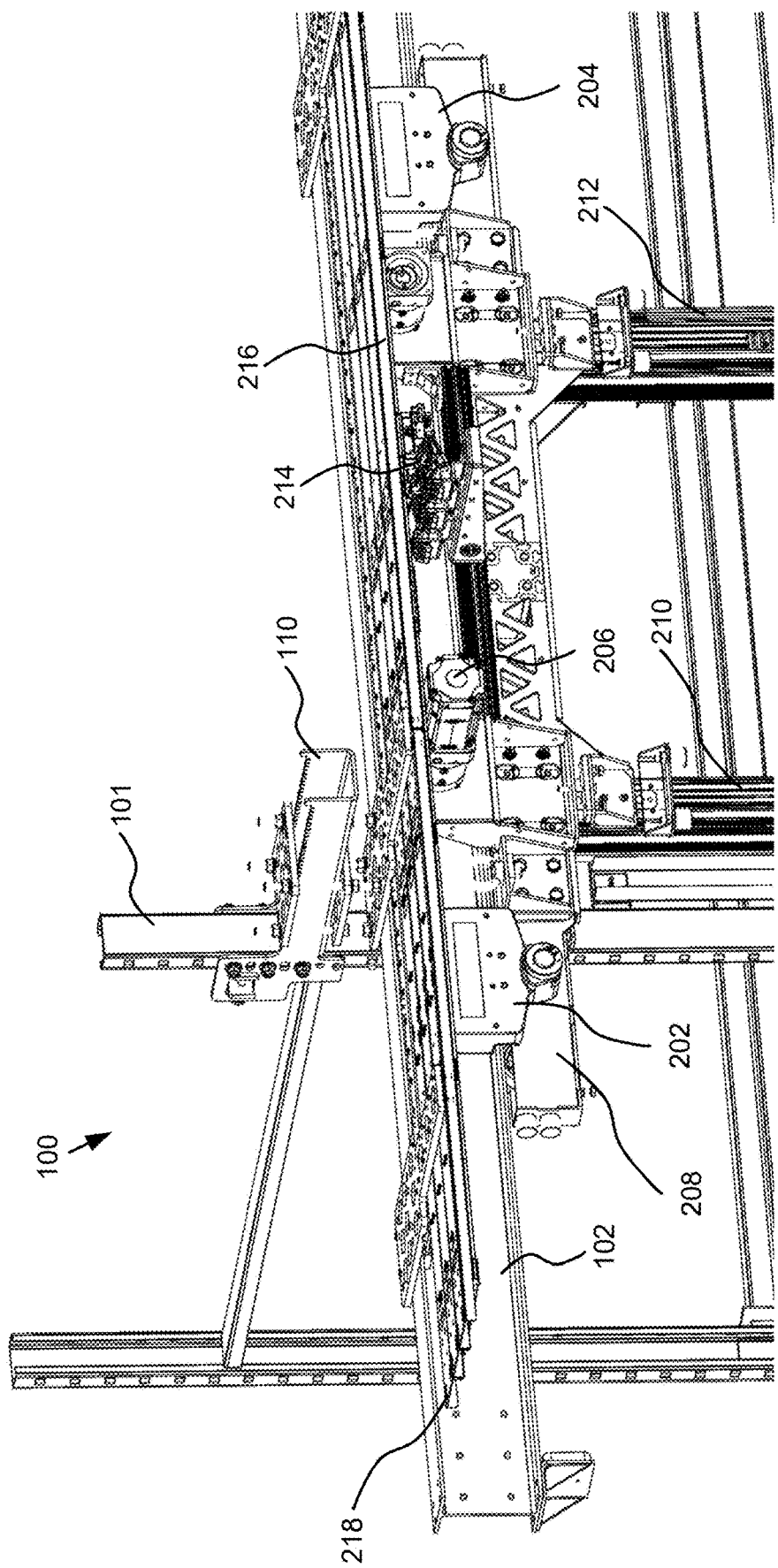
FIG. 2 depicts an upper portion of an example load handling system attached to storage racking.

FIG. 2 depicts an upper portion of an example load handling system 100 attached to storage racking 101. As shown in the example of FIG. 2, upper horizontal guide rail 102 may be an I or H type beam coupled with the storage racking 101 by the upper bracket assembly 110. The vertical guide rail assembly 104 is slidably coupled with the upper horizontal guide rail 102 by trolley 202 and trolley 204 and is moved along the upper horizontal guide rail 102 by upper horizontal drive motor 206. In some embodiments, multiple horizontal drive motors may attached to the vertical guide rail assembly 104 and move the vertical guide rail assembly 104 along the upper horizontal guide rail 102. The additional horizontal drive motors allow for the vertical guide rail assembly to more quickly move loads and/or handle heavier loads.

In the example of FIG. 2, the upper portion of the vertical guide rail assembly 104 includes a vertical guide rail mounting plates 208 which are bolted together and secure vertical rail 210 and vertical rail 212 of the vertical guide rail assembly 104 together. The other components of the upper portion of the vertical guide rail assembly 104, including, for example, upper horizontal drive motor 206, trolley 202, trolley 204, and sliding power connector 214, are also connected to vertical guide rail mounting plates 208. Sliding power connector 214 interfaces with power rail 216 and provides power to the components of the vertical guide rail assembly 104 as it moves along the upper horizontal guide rail 102.

As further shown in the example of FIG. 2, the upper bracket assembly 110 supports power rail 216 and upper gear rack 218. Upper gear rack 218 interfaces with a pinion gear (not shown) on upper horizontal drive motor 206. The rack and pinion system drives the vertical guide rail assembly 104 horizontally along upper horizontal guide rail 102.

Figure 3:
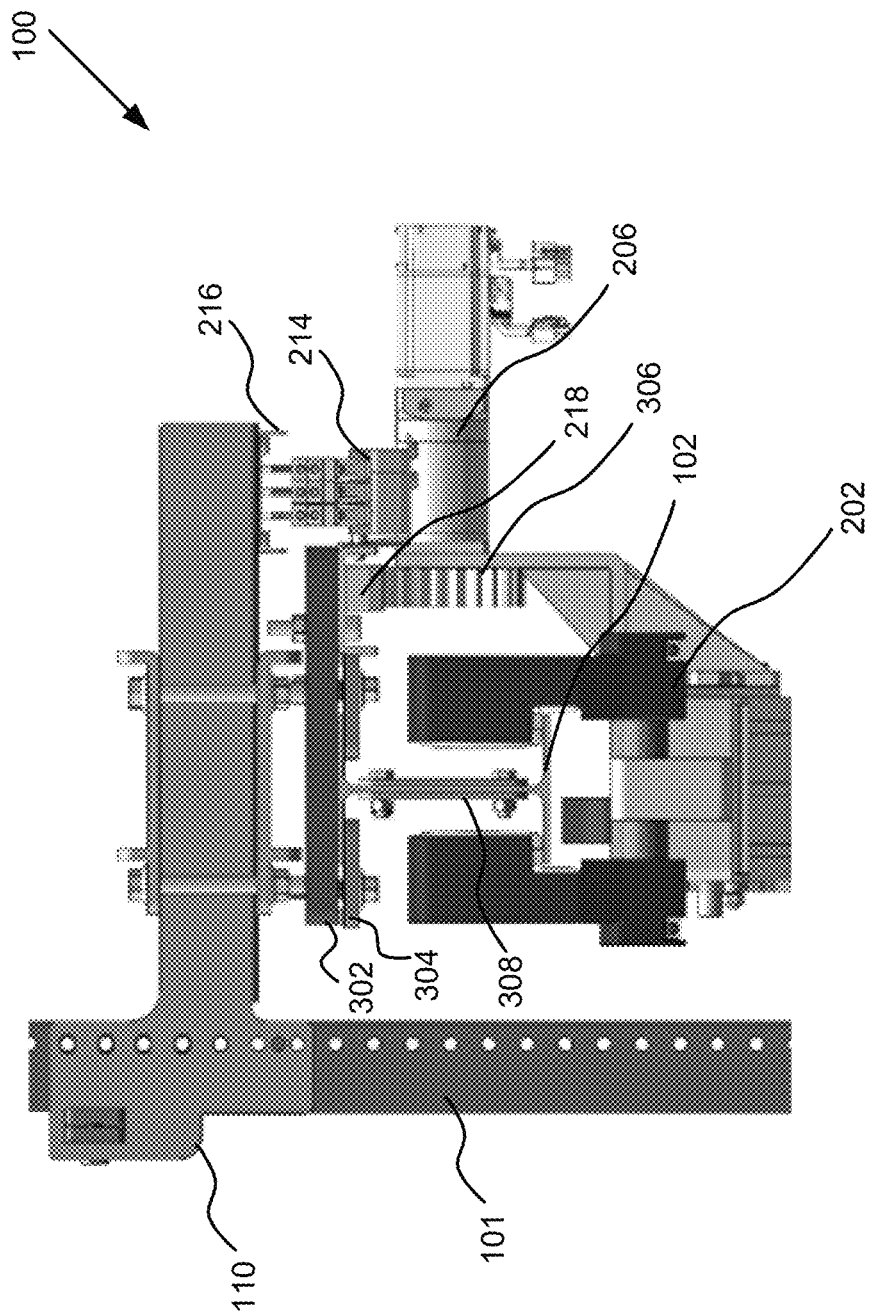
FIG. 3 is an end view of an upper portion of an example load handling system attached to storage racking.

FIG. 3 is an end view of an upper portion of an example load handling system 100 attached to storage racking 101. The example of FIG. 3 shows upper bracket assembly 110 attached to storage racking 101. The upper bracket assembly 110 supports the upper horizontal guide rail 102 via a guide rail support plate 302 and guide rail pressure plates 304. Trolley 202 of the vertical guide rail assembly 104 rests on and moves along the upper horizontal guide rail 102. As shown in example of FIG. 3, upper gear rack 218 is coupled with the guide rail support plate 302 and extends along the front of the storage racking 101 parallel to upper horizontal guide rail 102. Upper pinion gear 306 is coupled with upper horizontal drive motor 206 and engages with the upper gear rack 218 to drive the vertical guide rail assembly 104 along the upper horizontal guide rail 102. As shown in the example of FIG. 3, power rail 216 is coupled directly with upper bracket assembly 110 and engages with sliding power connector 214 to provide power to components of vertical guide rail assembly 104. In other embodiments, guide rail support plate 302 is longer and power rail 216 is attached to the bottom of guide rail support plate 302.

In some embodiments, to make installation of the load handling system easier, upper horizontal guide rail 102 is installed in multiple sections. To ensure proper alignment and strength at the joints of the multi-section upper horizontal guide rail 102, splints 308 are secured over the joints of the upper horizontal guide rail 102. When guide rail support plate 302 is installed on a joint in the upper horizontal guide rail 102, the guide rail support plate 302 similarly helps with the alignment and rigidity of the upper horizontal guide rail 102.

Figure 4:
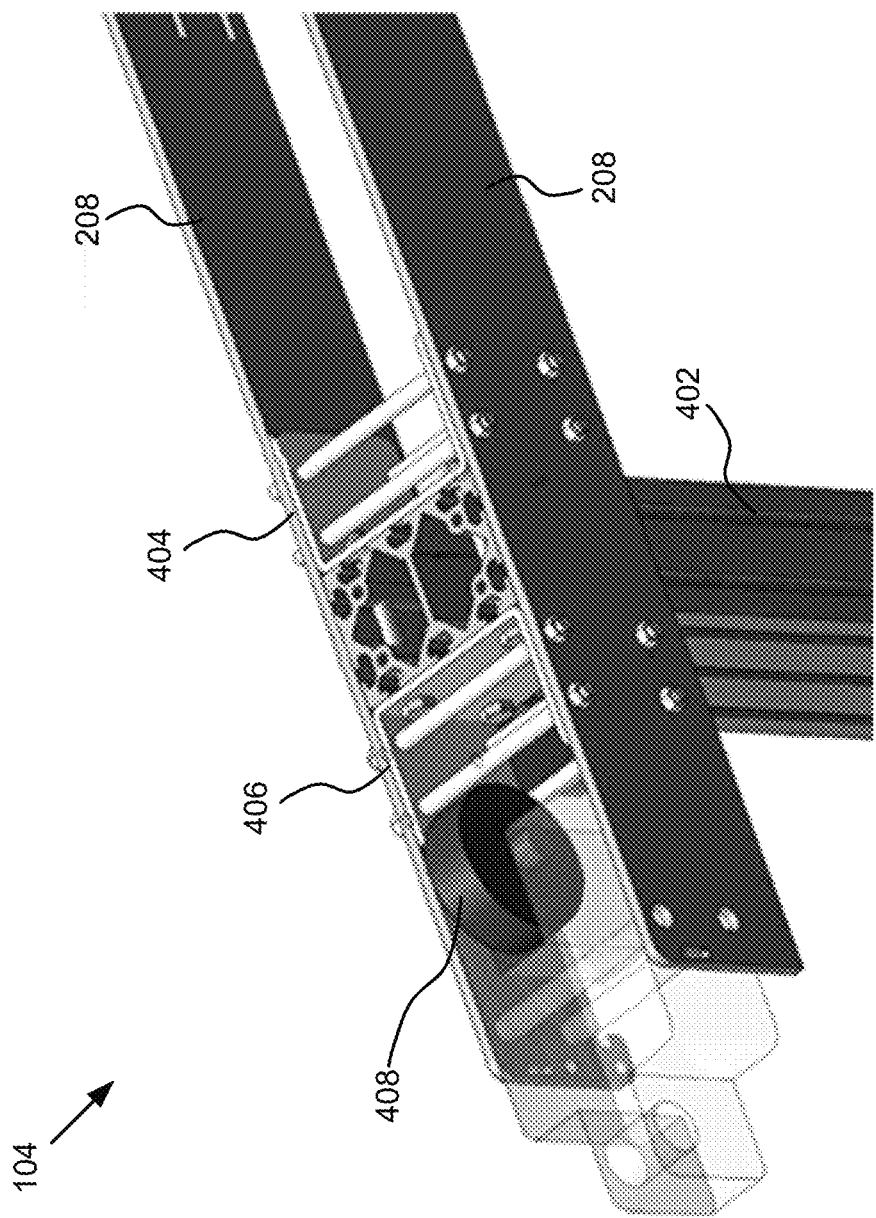
FIG. 4 depicts components of an upper portion of a vertical guide rail assembly in an example load handling system.

FIG. 4 depicts components of an upper portion of a vertical guide rail assembly 104 in an example load handling system 100. The vertical guide rail assembly 104 includes vertical guide rails along which a load handling device travels vertically in the load handling system 100. The example of FIG. 4 depicts a vertical guide rail 402 of a vertical guide rail assembly 104. The vertical guide rail 402 is secured to the vertical guide rail mounting plates 208 via bracket 406 and bracket 404 creating stability in all directions when a load handling device is traveling along the vertical guide rail 402. The vertical guide rail assembly 104 includes an anti-jump roller 408 that sits underneath the upper horizontal guide rail 102 and works with the wheels of trolley 202 to keep the vertical guide rail assembly 104 from bouncing off the upper horizontal guide rail 102. In some embodiments, anti-jump roller 408 is mounted on a pivot plate that is supported by a spring such that the anti-jump roller 408 maintains contact with the underside of the upper horizontal guide rail 102 to decrease the chance that the vertical guide rail assembly 104 comes off the upper horizontal guide rail 102.

FIG. 5 depicts an example of an upper bracket assembly 110 for attaching a load handling system to storage racking. The upper bracket assembly 110 includes an upper racking column adapter 502. A column adapter portion 503 of the upper racking column adapter 502 attaches to a column of storage racking 101 and a support member 504, extending from the column adapter portion 503 of the upper racking column adapter 502, supports the remaining components of the upper bracket assembly 110. To support the upper horizontal guide rail 102, guide rail support plate 302 is suspended from pressure plates 506 bolted together and compressed around the support member 504 of upper racking column adapter 502. Guide rail pressure plates 304 secure the upper horizontal guide rail 102 to the guide rail support plate 302. Guide rail support plate 302 also supports a rack plate 508 which houses upper gear rack 218 and power rail 216.

Adjustability of the upper bracket assembly is important because storage racking is rarely perfectly level, plumb, and straight. Horizontal guide rails attached to the front of storage racking with typical vertical and horizontal variations would lead to horizontal guide rails that are similarly not level, plumb, or straight and a vertical guide rail assembly traveling along such horizontal guide rails would bind and/or jump the track leading to decreased reliability and wasted time. The techniques described herein address the deficiencies above by providing adjustability in multiple directions for upper horizontal guide rail 102 (as described with reference to FIG. 6 through FIG. 8) and lower horizontal guide rail 106 (as described with reference to FIGS. 9 through FIG. 11). This adjustability allows the upper horizontal guide rail 102 and lower horizontal guide rail 106 to be attached to storage racking 101 and run level, plumb, and straight, even if the storage racking 101 is not perfectly level, plumb, and/or straight, so that vertical guide rail assembly 104 can travel smoothly across the face of storage racking 101.

FIG. 6 is a top view of upper bracket assembly 110 and depicts the ability to adjust the yaw of the upper bracket assembly 110 (i.e., horizontal angular adjustments left or right in the relative position between support member 504 and pressure plates 506 where the x-axis extends parallel to the face of storage racking 101 and the y-axis extends vertically). In one embodiment, pressure plates 506 allow for up to three degrees of adjustment around the support member 504 to correct for twist in the vertical posts of the storage racking 101. In addition to the angular adjustability of upper bracket assembly 110, pressure plates 506 can be positioned at any point along support member 504 to account for variations in depth of connection points to storage racking 101.

FIG. 7 is a side view of upper bracket assembly 110 and depicts the ability to adjust the pitch of the upper bracket assembly 110 (i.e., vertical angular adjustments in the relative position between the distal end of support member 504 and the face of storage racking 101 where the x-axis is aligned parallel to the face of storage racking 101). In one embodiment, column adapter portion 503 allows for up to three degrees of adjustment relative to a vertical post of storage racking 101 to account for unlevel storage racking 101.

FIG. 8 depicts the linear adjustability of the upper bracket assembly 110 in the vertical direction and the ability to control the roll of the upper bracket assembly 110 (i.e., angular adjustments around the z-axis where the x-axis is aligned parallel to the face of storage racking 101 and the z-axis extends perpendicularly in the horizontal direction to the x-axis). While the upper racking column adapter 502 can be placed at multiple positions along a vertical post of storage racking 101, the adjustability is somewhat limited due to the fact that bolt holes to fix the upper racking column adapter 502 are limited and at fixed intervals. To increase the vertical adjustability, the suspension bolts 802 that couple the guide rail support plate 302 with pressure plates 506 include additional threading so that fine adjustments to the vertical position of guide rail support plate 302 can be made so that upper horizontal guide rail 102 is level. Similarly, the vertical adjustability of suspension bolts 802 allow for adjustment in the roll of guide rail support plate 302 (e.g., by raising or lowering a pair of suspension bolts 802 on either side of support member 504).

Figure 9:
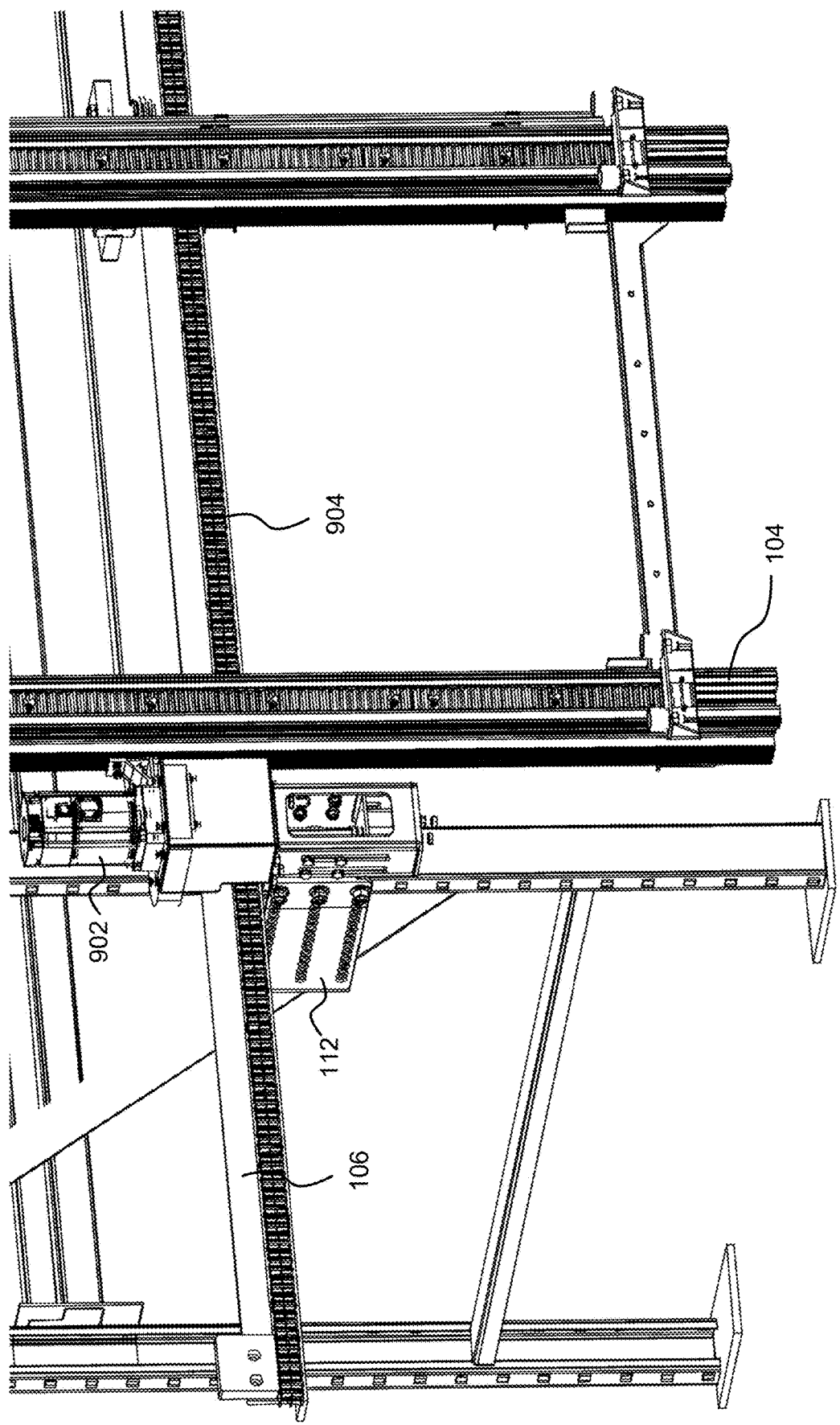
FIG. 9 depicts a lower portion of an example load handling system attached to storage racking.

FIG. 9 depicts a lower portion of an example load handling system 100 attached to storage racking 101. As depicted in the example of FIG. 9, lower horizontal guide rail 106 may be a U or L shaped track in which guide wheels of the vertical guide rail assembly 104 can slidably connect with lower horizontal guide rail 106. Lower horizontal guide rail 106 connects with the storage racking 101 by lower bracket assembly 112.

In some embodiments a lower horizontal drive motor 902 works in tandem with upper horizontal drive motor 206 to move vertical guide rail assembly 104 along the upper horizontal guide rail 102 and lower horizontal guide rail 106. In some embodiments, multiple lower horizontal drive motors may be attached to the vertical guide rail assembly 104 and move the vertical guide rail assembly 104 along the lower horizontal guide rail 106. The additional horizontal drive motors allow for the vertical guide rail assembly 104 to more quickly move loads and/or handle heavier loads. In one embodiment, lower horizontal drive motor 902 may include a lower pinion gear (not shown) that engages with a lower gear rack 904 to drive vertical guide rail assembly 104 along lower horizontal guide rail 106.

Figure 10:
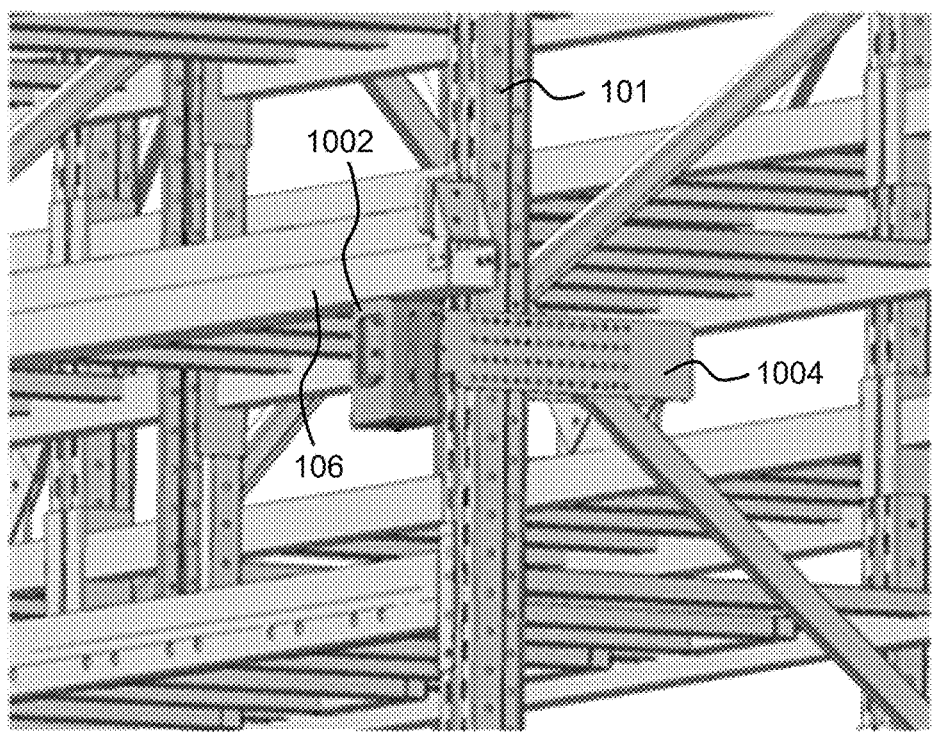
FIG. 10 depicts an example of a lower bracket assembly for attaching a load handling system to storage racking.

FIG. 10 depicts an example of a lower bracket assembly 112 for attaching a load handling system 100 to storage racking 101. In one embodiment, lower bracket assembly 112 includes a lower racking column adapter 1004 and a lower horizontal rail support 1002. As shown in the example of FIG. 10, lower racking column adapter 1004 attaches to columns of storage racking 101 and lower horizontal rail support 1002 attaches to one end of lower racking column adapter 1004. As described herein, adjustability of lower bracket assembly 112 allows lower horizontal guide rail 106 to be installed level, straight, and plumb with the upper horizontal guide rail, which allows the vertical guide rail assembly 104 to traverse the upper horizontal guide rail and lower horizontal guide rail smoothly without binding or jumping.

Figure 11:
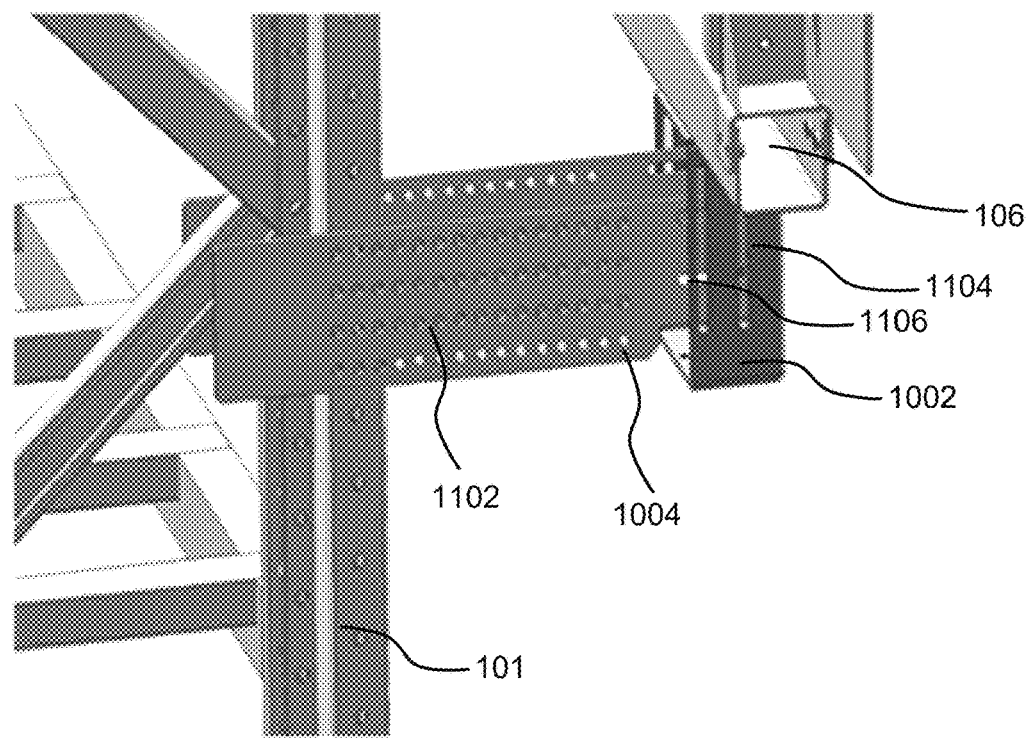
FIG. 11 depicts another view of an example of a lower bracket assembly for attaching a load handling system to storage racking.

FIG. 11 depicts another view of an example of a lower bracket assembly 112 for attaching a load handling system 100 to storage racking 101. As can be seen in the examples of FIG. 10 and FIG. 11, lower racking column adapter 1004 includes a plurality of connection point holes 1102 that allow lower racking column adapter 1004 to be connected at various positions relative to the front of storage racking 101 so that lower horizontal guide rail 106 is straight and vertical guide rail assembly 104, when attached to lower horizontal guide rail 106 and the upper horizontal guide rail, is plumb. Lower horizontal rail support 1002 provides additional vertical adjustability so that lower horizontal guide rail 106 is level when installed on storage racking 101. In some embodiments, mounting slots 1104 in lower horizontal rail support 1002 and mounting slots 1106 in lower racking column adapter 1004 allow the lower horizontal rail support 1002 to be installed at various heights and angles relative to lower racking column adapter 1004 so that lower horizontal guide rail 106 can be installed level, plumb, and straight.

As described herein, existing storage racking may have defects due to wear and/or collision during installation or normal use. These defects create an imperfect foundation for the installation of horizontal guide rails used by the vertical guide rail assembly and leads to imperfect horizontal and/or vertical installation of the horizontal guide rails that the vertical guide rail assembly must cross. These imperfections include horizontal and vertical bending and/or deviation of the horizontal guide rails. When there is a large variation in the deviation between horizontal guide rails and pinion racks, a pinion gear on a fixed motor system engaging with the gear rack cannot accommodate the difference resulting in the vertical guide rail assembly getting stuck on the horizontal guide rails and unable to run.

Figure 12:
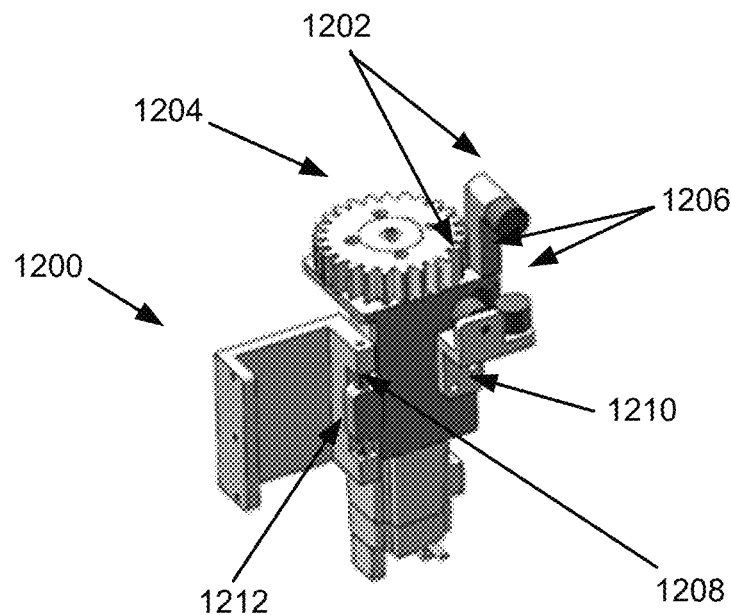
FIG. 12 depicts an example of a flexible motor mount for use in a load handling system.

FIG. 12 depicts an example of a flexible motor mount 1200 for use in a load handling system 100 to address the challenges described above. The flexible motor mount 1200 includes upper and lower limit guide wheels 1202 configured to keep the pinion gear 1204 aligned vertically with the gear rack. Front and rear limit guide wheels 1206 are configured to keep the pinion gear 1204 in contact with the gear rack. To minimize impact of variation in the horizontal and vertical position of the guide rails the flexible motor mount 1200 includes a compression spring assembly 1208 coupling motor mount 1210 with vertical guide rail assembly mount 1212. The flexible motor mount 1200 thus allows the vertical guide rail assembly to smoothly traverse storage racking even if there are variations in the guide rails.

Figure 13:
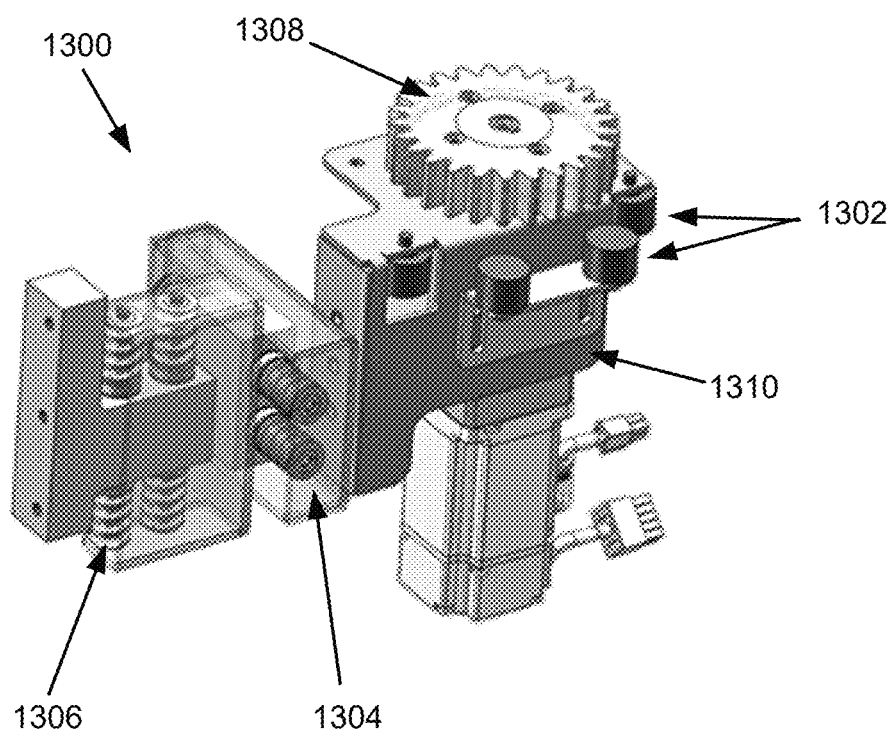
FIG. 13 depicts an example of a flexible motor mount for use in a load handling system attached to the vertical guide rail assembly.

FIG. 13 depicts an example of another embodiment of a flexible motor mount 1300 for use in a load handling system 100 to address the challenges described above. Flexible motor mount 1300 includes front and rear limit guide wheels 1302 which are configured to keep the pinion gear 1308 in contact with the gear rack. To further minimize impact of variation in the horizontal and vertical position of the guide rails the flexible motor mount 1300 includes a first compression spring assembly 1304 and a second compression spring assembly 1306 coupling motor mount 1310 with a vertical guide rail assembly. First compression spring assembly 1304 provides horizontal flexibility and second compression spring assembly 1306 provides vertical flexibility for flexible motor mount 1300 and allows the vertical guide rail assembly to smoothly traverse storage racking even if there are variations in the guide rails.

Figure 14:
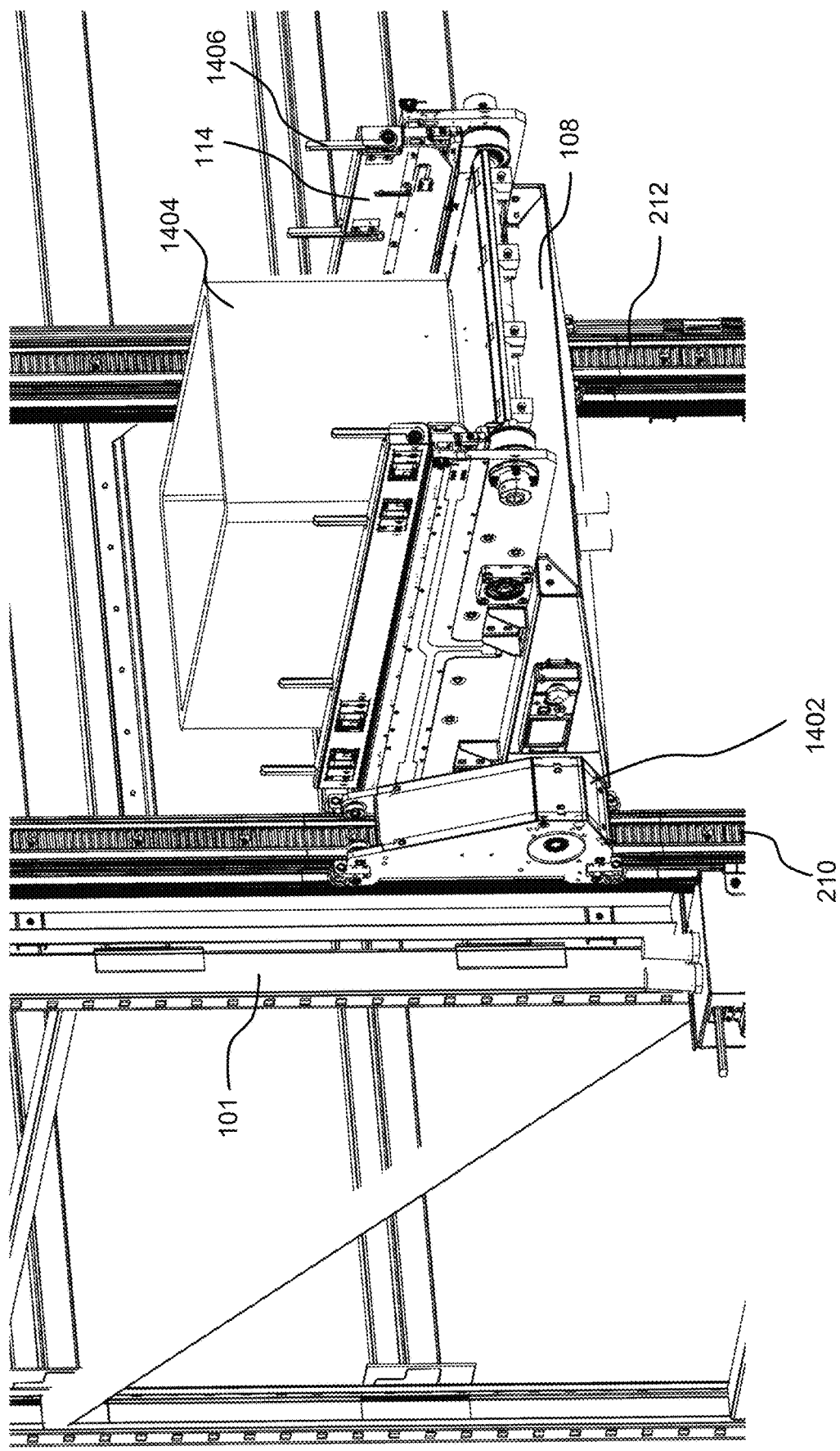
FIG. 14 depicts an example load handling platform and load handling device for use in a load handling system.

FIG. 14 depicts an example load handling platform 108 and load handling device 114 for use in a load handling system 100. Load handling platform 108 is slidably coupled with vertical rail 210 via vertical slider assembly 1402, vertical rail 212, and a second vertical slider assembly hidden from view in the example of FIG. 14. The vertical slider assemblies include motors (not shown in the example of FIG. 14) configured to move load handling platform 108 vertically along vertical rail 210 and vertical rail 212 and position load handling device 114 to manipulate loads (e.g., place, retrieve, move, etc.), such as tote 1404, stored on storage racking 101. To aid in manipulating loads, load handling device 114 includes retractable fingers 1406 which raise or lower to engage with a load being handled, as described in more detail elsewhere herein.

Figure 15:
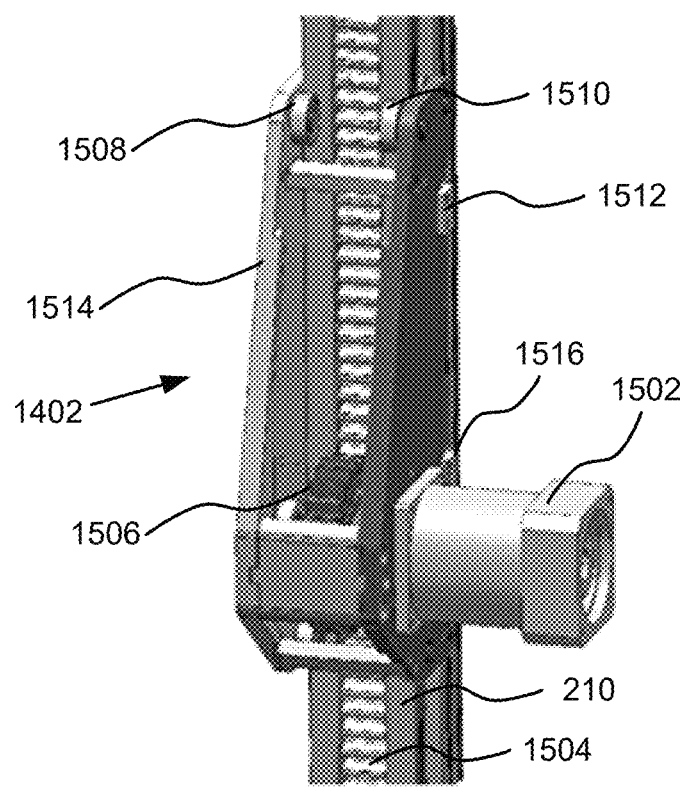
FIG. 15 depicts an example vertical slider assembly configured to move a load handling platform vertically along a vertical rail.

FIG. 15 depicts an example vertical slider assembly 1402 configured to move a load handling platform 108 vertically along vertical rail 210. The components of vertical slider assembly 1402 are contained within or attached to assembly housing 1514. Vertical drive motor 1502 is coupled with assembly housing 1514 and drives pinion gear 1506 which interfaces with gear rack 1504 to move 1402 and the attached load handling platform vertically along vertical rail 210. Front limit guide wheel 1508 and 1510, side limit guide wheel 1512 and 1516, and rear limit guide wheels (not shown in the example of FIG. 15) maintain the pinion gear 1506 in contact with gear rack 1504.

Figure 16:
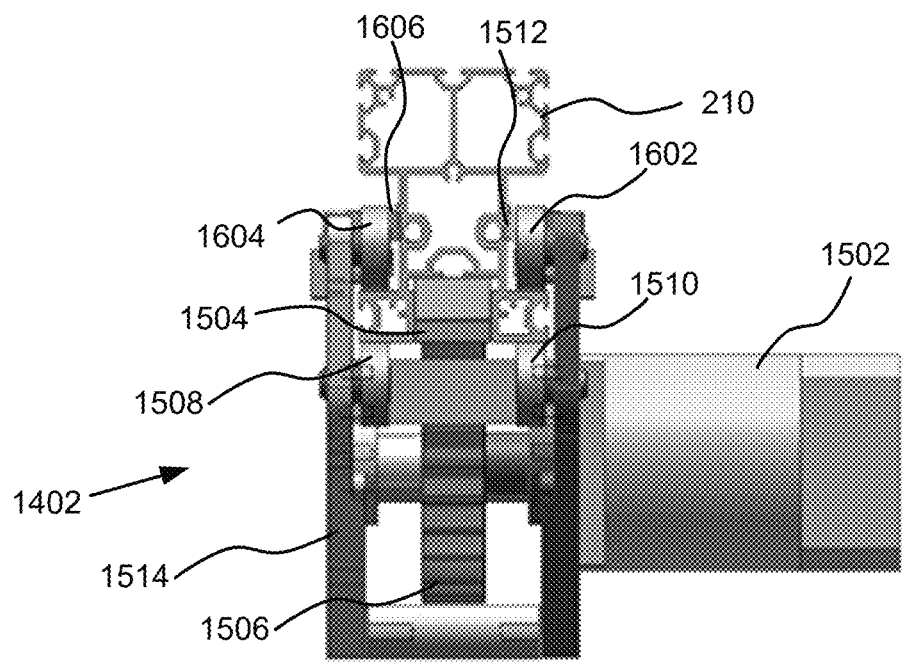
FIG. 16 is a cutaway view from the top of an example vertical slider assembly.

FIG. 16 is a cutaway view from the top of an example vertical slider assembly 1402. The example of FIG. 16 shows the profile of vertical rail 210 and how the components of vertical slider assembly 1402 engage with vertical rail 210 to move vertically along vertical rail 210. Front limit guide wheel 1508 and 1510 roll along a front side of vertical rail 210 and rear limit guide wheel 1602 and 1604 roll along the rear side of a limit guide wheel flange of the vertical rail while side limit guide wheel 1512 and 1606 roll along opposite sides of vertical rail 210 to slidably couple vertical slider assembly 1402 with vertical rail 210 while maintaining pinion gear 1506 in contact with gear rack 1504.

Figure 17:
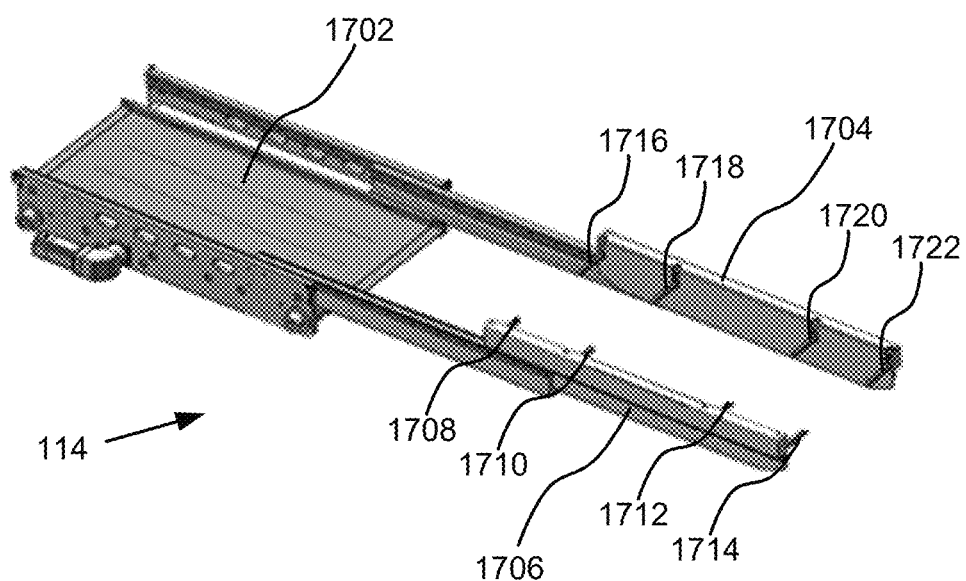
FIG. 17 depicts an example load handling device for use in a load handling system.

FIG. 17 depicts an example load handling device 114 for use in a load handling system 100. In the example of FIG. 17, load handling device 114 includes a body 1702 and fork 1704 and 1706. Fork 1704 and 1706 include a plurality of fingers, such as finger 1708, 1710, 1712, 1714, 1716, 1718, 1720, and 1722. The fingers, all shown in a lowered position in the example of FIG. 17, are configured to raise and lower in different configurations to manipulate a load. Manipulation of a load may include retrieving a load from storage racking or a pick-up and drop-off location and pulling it onto body 1702 or pushing a load from body 1702 onto the storage racking or a pick-up and drop-off location. In the embodiment shown in FIG. 17, fork 1704 and 1706 are designed to reach loads that are stacked more than one layer deep on storage racking, as described with reference to FIGS. 18-20 below. In some embodiments, either one or both of fork 1704 and 1706, in addition to extending either direction to manipulate loads on either side of load handling device 114, may shift laterally along body 1702 to accommodate loads of varying width.

While the horizontal and vertical guide rails can be installed level, plumb, and straight according to the techniques described herein to optimize movement of load handling device 114 along storage racking 101, variations in storage racking can lead to items on the storage racking shelves being located at various distances from load handling platform 108. If those distances are not accounted for by load handling device 114, attempts to retrieve a load from storage racking 101 may fail because the distance fork 1704 and 1706 extends could either be too short or too far to accurately retrieve the load. In one embodiment, to account for these variations in distance, load handling system 100 can measure the distance to each object with location information so that load handling device 114 can accurately retrieve the object. In one embodiment, each object stored on storage racking 101 may be marked with a barcode or some other indicator that can be read by a camera or other reader on load handling platform 108 or load handling device 114 so that a distance can be determined based on the barcode.

Figure 18:
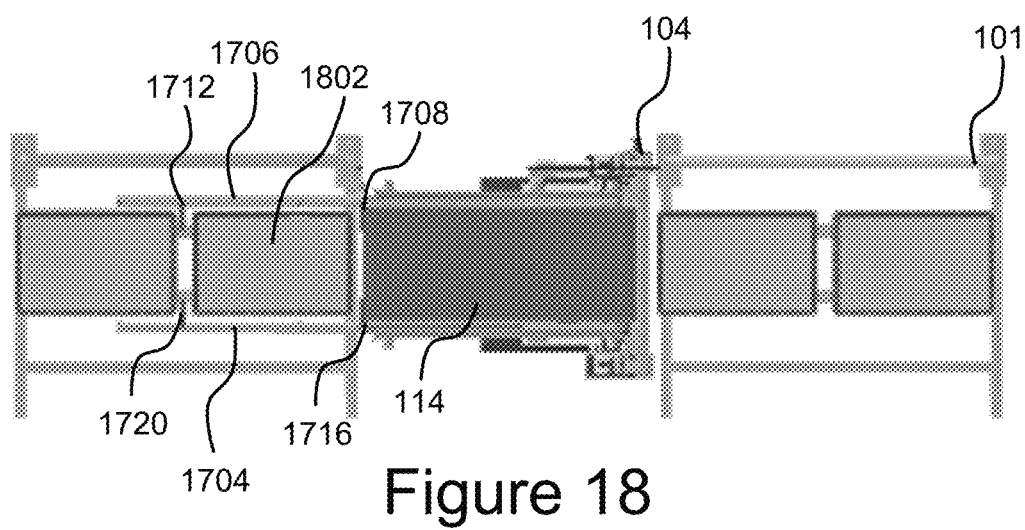
FIG. 18 depicts an overhead view of an example vertical guide rail assembly mounted between two rows of storage racking.
Figure 19:
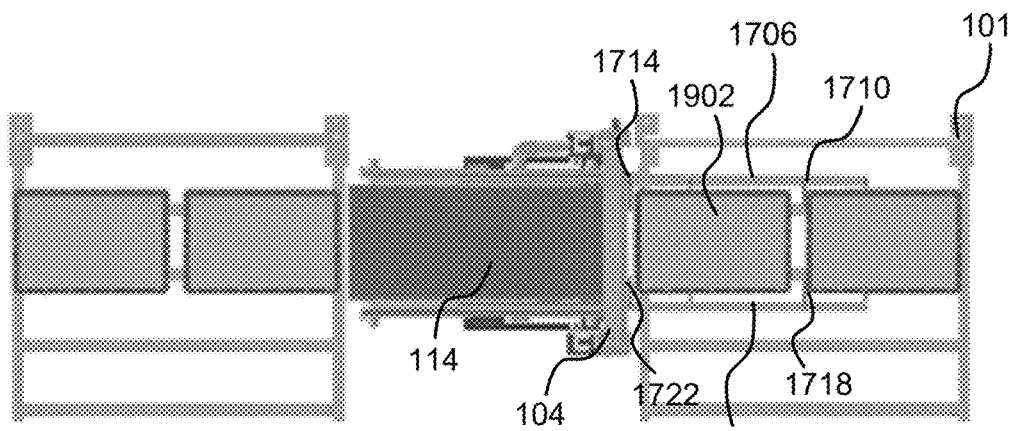
FIG. 19 depicts an overhead view of an example vertical guide rail assembly mounted between two rows of storage racking.
Figure 20:
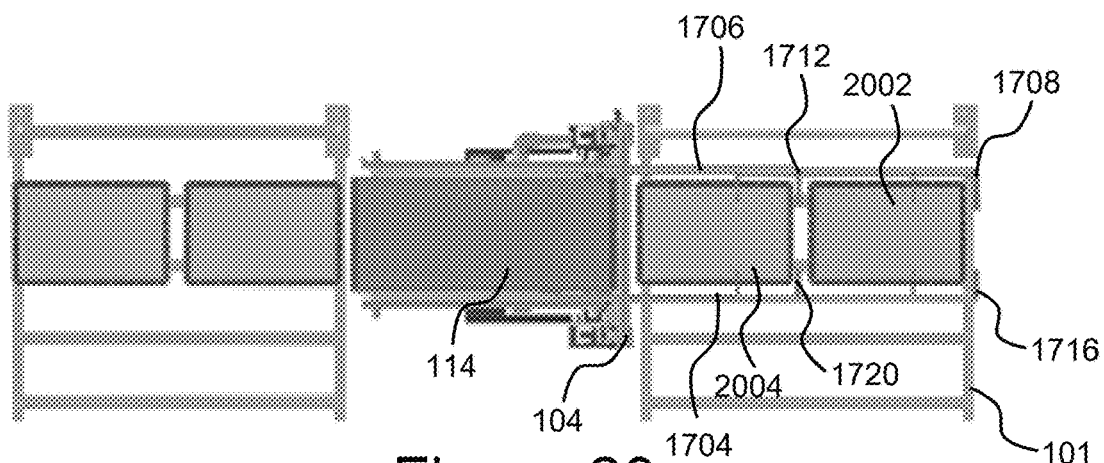
FIG. 20 depicts an overhead view of an example vertical guide rail assembly mounted between two rows of storage racking.

FIGS. 18-20 depict an example process for manipulating loads on storage racking 101 by load handling device 114. FIG. 18 depicts an overhead view of vertical guide rail assembly 104 mounted between two rows of storage racking 101. According to the techniques described herein, when mounted to one of the rows of storage racking on horizontal and vertical guide rails, load handling device 114 can access any position along either side of storage racking. As shown in the example of FIG. 18, load handling device 114 is extending fork 1704 and 1706 in the direction away from where vertical guide rail assembly 104 is attached to storage racking 101. When manipulating a load, such as tote 1802, load handling device 114 lowers finger 1708, 1712, 1716, and 1720 to encompass the corners of tote 1802 and retrieve or store the tote 1802 on storage racking 101. It should be appreciated, particularly in light of the following examples, that various combinations of fingers and fork depths can be used to access any position in storage racking.

FIG. 19 depicts an overhead view of vertical guide rail assembly 104 mounted between two rows of storage racking 101. As shown in the example of FIG. 19, load handling device 114 is extending fork 1704 and 1706 in the direction toward where vertical guide rail assembly 104 is attached to storage racking 101. When manipulating a load, such as tote 1902, load handling device 114 lowers finger 1710, 1714, 1718, and 1722 to encompass the corners of tote 1902 and retrieve or store the tote 1902 from or to storage racking 101.

Increasing the stroke length of fork 1704 and 1706 and using a different combination of fingers allows load handling device 114 to reach deeper into storage racking 101 and manipulate loads. Increasing the reach depth allows for fewer load handling systems to be deployed in a system than if each load handling device could only reach the first row of objects in storage racking. FIG. 20 depicts an overhead view of vertical guide rail assembly 104 mounted between two rows of storage racking 101. As shown in the example of FIG. 20, load handling device 114 is extending fork 1704 and 1706 beyond the first row of objects and accessing an object, for example tote 2002, in the second row. To retrieve or store tote 2002 load handling device 114 lowers finger 1708, 1712, 1716, and 1720 to encompass the corners of tote 2002 and retrieve or store the tote 2002 from or to storage racking 101. With the configuration shown in the example of FIG. 20, load handling device 114 can retrieve tote 2002 and 2004 simultaneously or individually.

Figure 21:
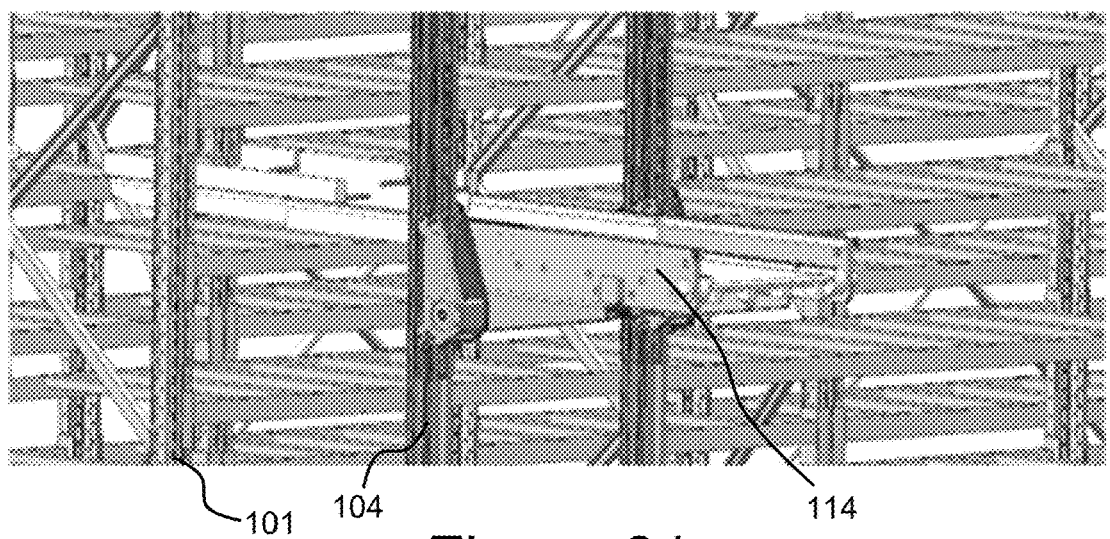
FIG. 21 shows an example load handing device coupled with vertical guide rail assembly and extending into storage racking from a different perspective.

FIG. 21 shows an example load handing device 114 coupled with vertical guide rail assembly 104 and extending into storage racking 101 from a different perspective.

In some embodiments, load handling system 100 may be part of a larger fulfillment environment where load handling system 100 delivers a load to human workers located at workstations throughout the facility. In one embodiment, a workstation may be incorporated into storage racking 101. FIG. 22 depicts an example workstation integrated into storage racking 101. In the example of FIG. 22, a workstation may include one or more racks installed at an angle, such as rack 2204. The angled rack provides easier access to the contents of a tote, such as tote 2206, for a worker located at the workstation. A load handling system 100 as described herein may be attached to the opposite side of storage racking 101 from the work station. In the example of FIG. 22, load handling device 114 of load handling system 100 traverses storage racking 101 and picks up and drops off totes to the workstation.

Figure 23:
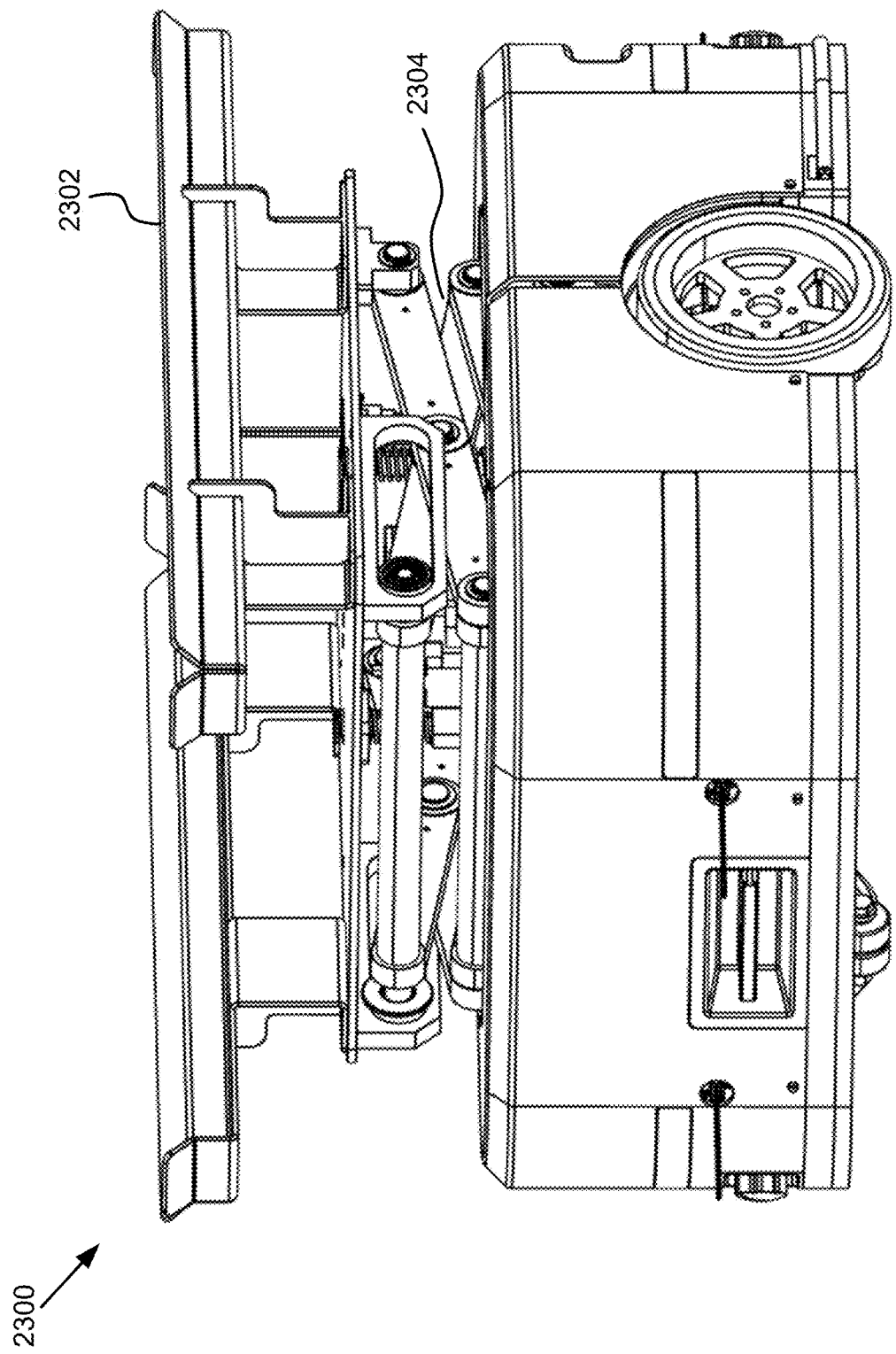
FIG. 23 depicts an example ground handling device for use in a load handling system.

In some embodiments, workstations are located remotely from storage racking and loads, such as totes, must be moved from storage racking to a workstation. Various solutions, including automated ground vehicles, have been implemented to transport loads between storage racking and workstations. FIG. 23 depicts an example ground handling device, such as automated ground vehicle 2300, for use as part of load handling system 100. In a system such as load handling system 100 where automated ground vehicle 2300 may be interacting with loads at varying heights it would be beneficial to have an automated ground vehicle that has an adjustable load interface 2302. Lifting mechanism 2304 adjusts the height of load interface 2302 depending on the context of the interaction by automated ground vehicle 2300. For example, to allow for easier maneuverability of automated ground vehicle 2300 throughout storage racking, pick up and drop off locations, as well as shelves and vertical guide rail assembly 104 may be elevated off of the floor. To retrieve a load, automated ground vehicle 2300 raises adjustable load interface 2302 and lifts the load off of an elevated pick up and drop off location in storage racking. Once the load has been retrieved, adjustable load interface 2302 is retracted and automated ground vehicle 2300 can navigate throughout the facility without interfering with overhead objects.

Figure 24:
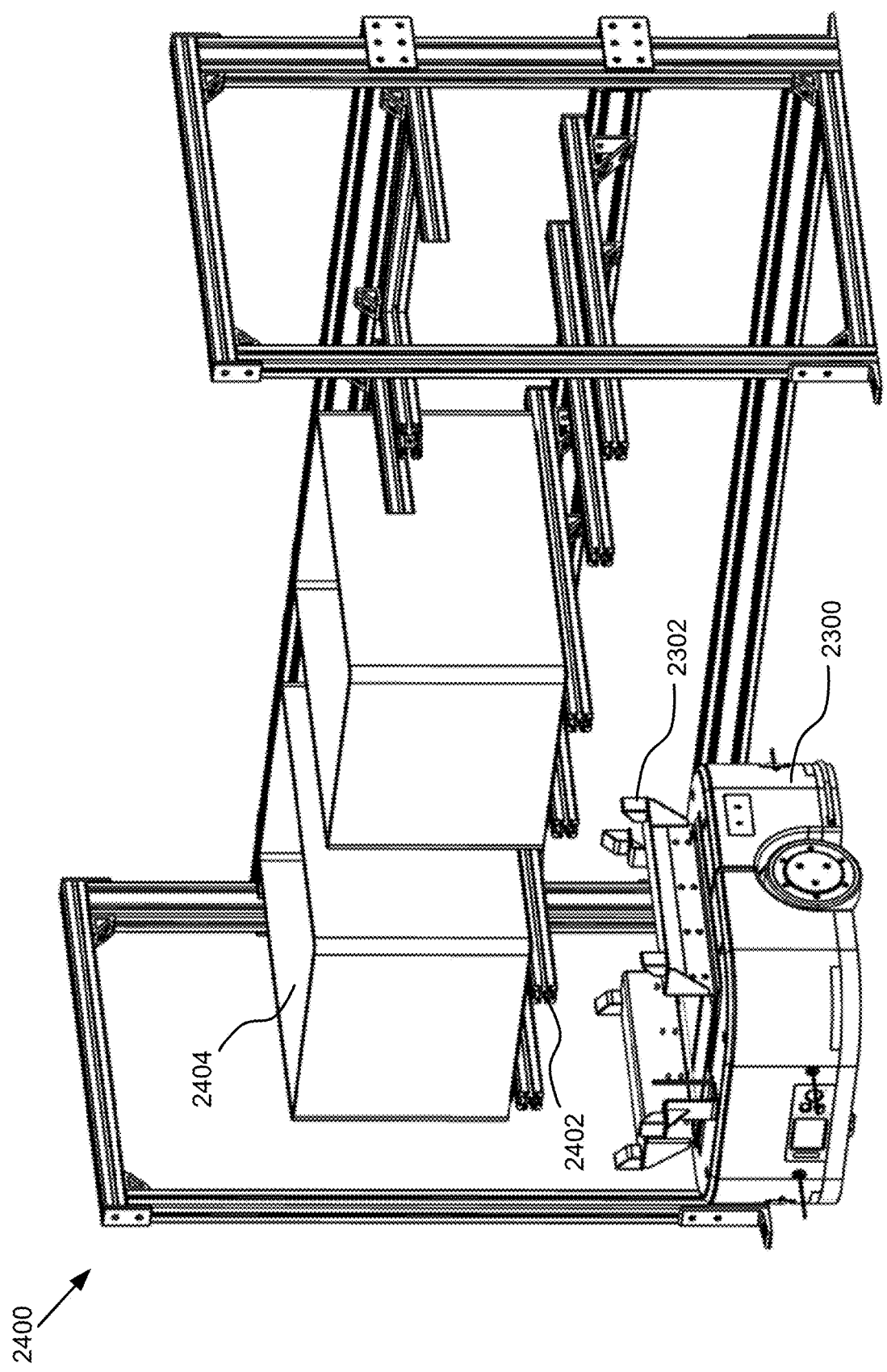
FIG. 24 depicts an example elevated workstation with multiple pick up and drop off locations.

FIG. 24, depicts an example elevated workstation 2400 with multiple pick up and drop off locations 2402. Automated ground vehicle 2300 transfers a load between storage racking and elevated workstation 2400. As depicted in the example of FIG. 24, automated ground vehicle 2300 is retrieving tote 2404 from pick up and drop off location 2402. Automated ground vehicle 2300 drives under pick up and drop off location 2402 and raises adjustable load interface 2302 to lift tote 2404 off of elevated workstation 2400. After lifting tote 2404, automated ground vehicle 2300 moves away and can lower adjustable load interface 2302 to avoid interference with other objects in the facility.

In some embodiments, instead of automated ground vehicle 2300 using adjustable load interface 2302 to lift tote 2404 to an ergonomic height, a component of the pick up and drop off location 2402 may be configured to raise and lower the tote. For example, in one embodiment, automated ground vehicle 2300 may be configured to navigate on a closed loop to a load transition station where load handling device 114 deposits a load on automated ground vehicle 2300. Automated ground vehicle 2300 carries the load on the closed loop to a workstation where a lifting platform raises the load off of automated ground vehicle 2300 up to an ergonomic height for a worker at the workstation. In some embodiments, the workstation may include a conveyor to move one or more loads from the lifting platform to a worker and from the worker to a lowering platform where the lowering platform places the load on a automated ground vehicle 2300 to return on the closed loop to a transition station where load handling device 114 retrieves the load from automated ground vehicle 2300.

Figure 25:
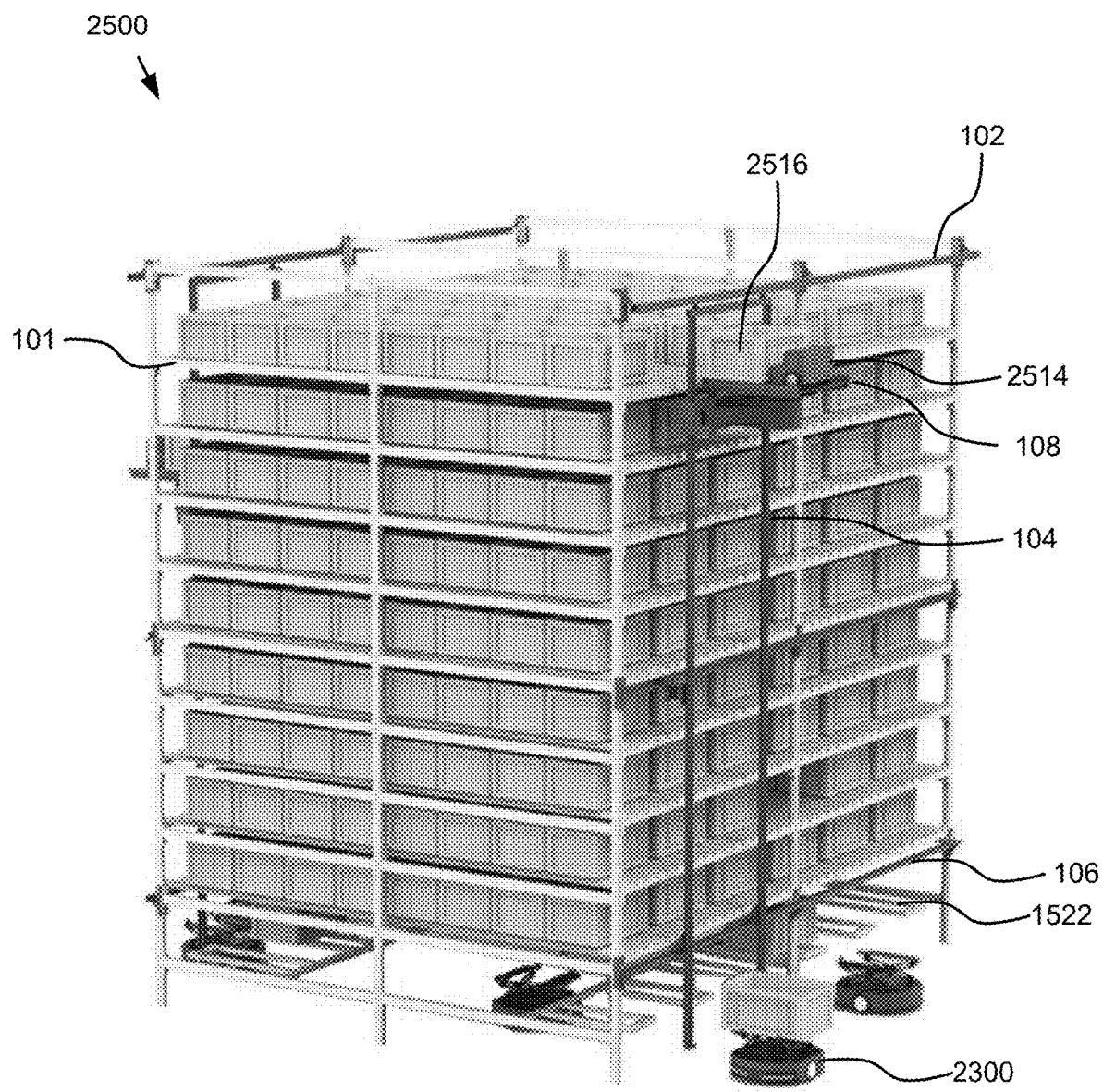
FIG. 25 depicts an example modularized storage system.

FIG. 25 depicts a modularized storage system 2500, which can adapt to the needs and storage space constraints of various environments, while maintaining a reasonable production cost. To achieve low-cost flexibility, the modularized storage system 2500 in the example of FIG. 25 utilizes standard storage racking 101 but may be configured to work with any number of storage racking configurations. Modularized storage system 2500 includes a load handling system 100 as described herein and one embodiment is depicted in the example of FIG. 25. Horizontal guide rails, such as upper horizontal guide rail 102 and 106, are attached to the storage racking 101. In the example of FIG. 25, vertical guide rail assembly 104 includes load handling platform 108 and load handling device 2514. In the example of FIG. 25, load handling device 2514 is configured to drive off of the load handling platform 108 and retrieve objects, such as tote 2516, from storage racking 101.

As described herein, load handling platform 108 is configured to move vertically along vertical guide rail assembly 104 and deliver the load handling device 2514 to any shelf of the storage racking 101. Similarly, the vertical guide rail assembly 104 is configured to move horizontally along the storage racking 101 to deliver load handling device 2514 to any point in storage racking 101. In some embodiments, the load handling platform 108 may further include imaging or other sensing devices to orient itself and deliver load handling device 2514 to the appropriate location on the storage racking 101.

As shown in the example of FIG. 25, the modularized storage system 2500 includes load transition stations, such as load transition station 1522. The load transition stations allow for the modularized storage system 2500 to use a multi-deep dense storage system (i.e., multiple objects can be stored on a single row). Load handling device 2514 may use the load transition station 1522 to hold an object while returning to retrieve the next object in a row. Additionally, the load transition station 1522 may be used as a pick-up and drop-off area for automated ground vehicles, such as automated ground vehicle 2300, to retrieve objects and transport them to other areas of the storage facility for further processing. In some embodiments, automated ground vehicle 2300 may be equipped with wireless charging equipment that interacts with a wireless charging station when stopped at a load transition station.

Figure 26:
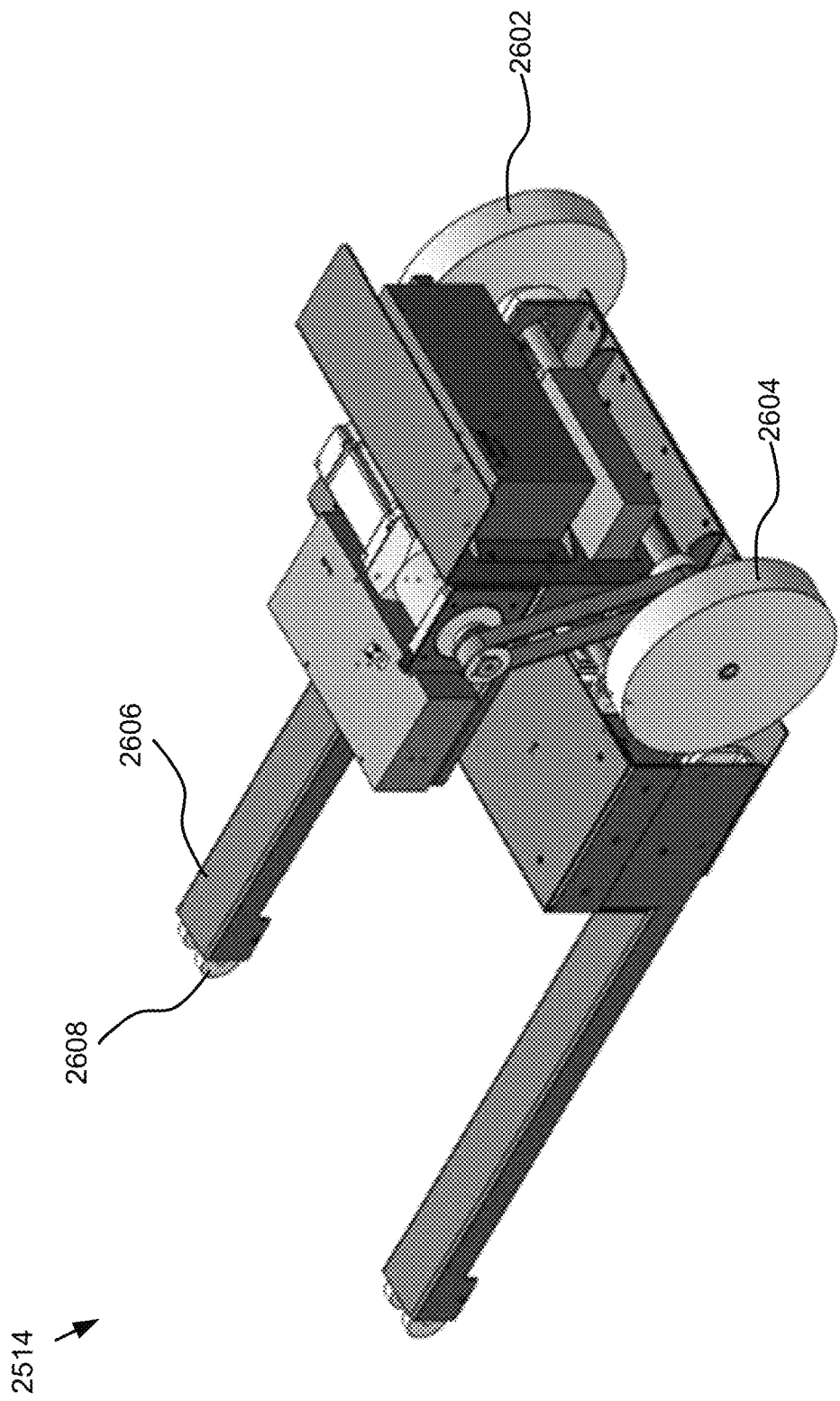
FIG. 26 is an illustration of an example load handling device.

FIG. 26 is an illustration of an example load handling device 2514. The load handling device 2514 may include drive wheel 2602 and 2604. The drive wheels allow the load handling device 2514 to detach from load handling platform 108 and navigate the storage rack 101 independently of the vertical guide rail assembly 104. In some embodiments, drive wheels 2602 and 2604 can operate independently allowing the load handling device 2514 to travel omnidirectionally.

As shown in the example of FIG. 26, the Load handling device 114 may include one or more forks 2606 that are configured to handle objects. In some embodiments, the forks 2606 are configured to handle multiple objects at once, effectively reducing the number of trips load handling device 2514 needs to make to get to deeper objects in the multi-deep storage system. The forks 2606 may further include one or more guide wheels 2608 that are configured to support the forks and assist the load handling device 2514 in navigating the storage rack 101. For example, the guide wheels 2608 and the drive wheels 2602 and 2604 may be configured to interface with tracks in corrugated decking of the storage rack 101 that guide the load handling device 2514 in and out of the storage rack 101. While the example of FIG. 26 depicts load handling device 2514 having two forks, it should be understood that any number of forks may be present on a load handling device 2514 to accommodate different types of loads.

Figure 27:
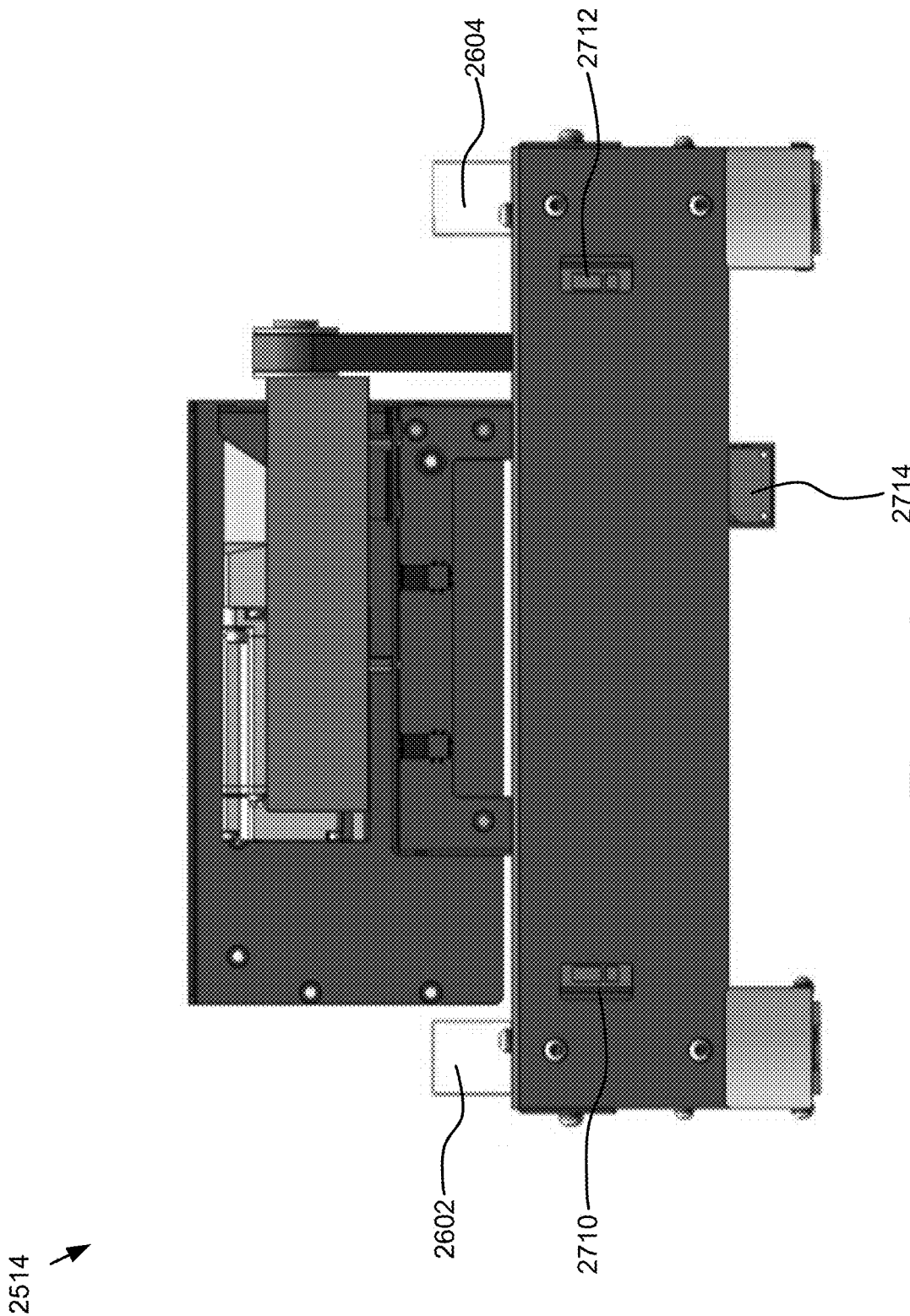
FIG. 27 is a front view of an example load handling device.

FIG. 27 is a front view of an example load handling device 2514. Load handling device 2514 includes sensors to help navigate a storage rack. For example, load handling device 2514 may include object detection sensor 2710 and 2712. Object detection sensor 2710 and 2712 may be configured to detect proximity to and position of objects with which load handling device 2514 may interact. In one embodiment, object detection sensors 2710 and 2712 may determine if an object is in a suitable position for load handling device 2514 to lift and retrieve. In some embodiments, object detection sensor 2710 and 2712 can detect the beginning and end of an object to identify whether the object is positioned within the lifting zone of load handling device 2514.

Load handling device 2514 may further include one or more device position sensors, such as device position sensor 2714. Device position sensor 2714 may be configured to determine the position of load handling device 2514 within a storage rack. For example, device position sensor 2714 may be configured to count marks, holes, or other position identifying features on the corrugated decking or work bays of a storage rack to determine its position. Additionally, information from device position sensors and motor encoders for the motors operating drive wheel 2602 and 2604 may be combined to better determine a position of load handling device 2514. In some embodiments, storage racking may include reference points (e.g., the front of the rack, a specific mark or identifier within a rack) to signify a position within the rack to load handling device 2514.

Figure 28:
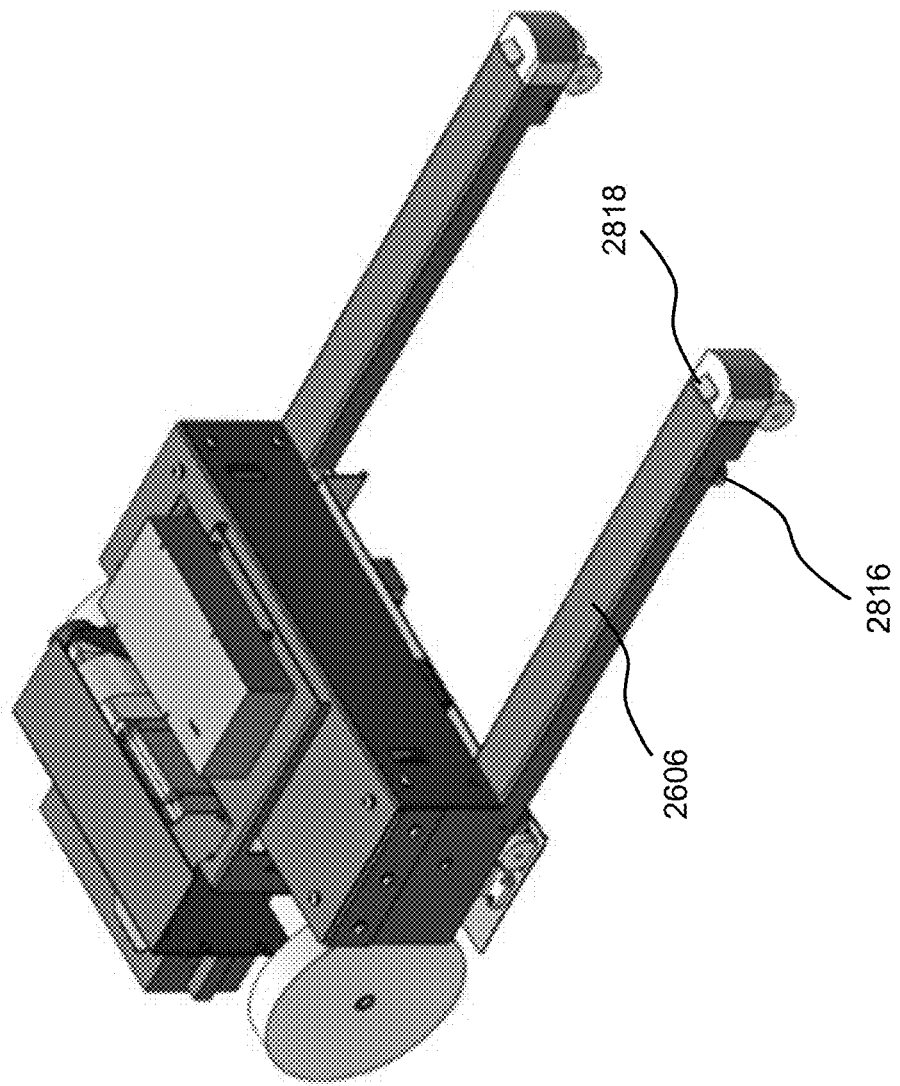
FIG. 28 a perspective view of an example load handling device.

FIG. 28 is another view of an example load handling device 2514. As seen in the example of FIG. 26, the forks 2606 of load handling device 2514 may include one or more spring loaded idler wheels 2816 to maintain the position of load handling device 2514 in the tracks of the corrugated decking. Additionally, the forks of load handling device

2514 may include object retention devices, such as object retention device 2818, that provide a retention mechanism for objects being transported by load handling device 2514.

Figure 29:
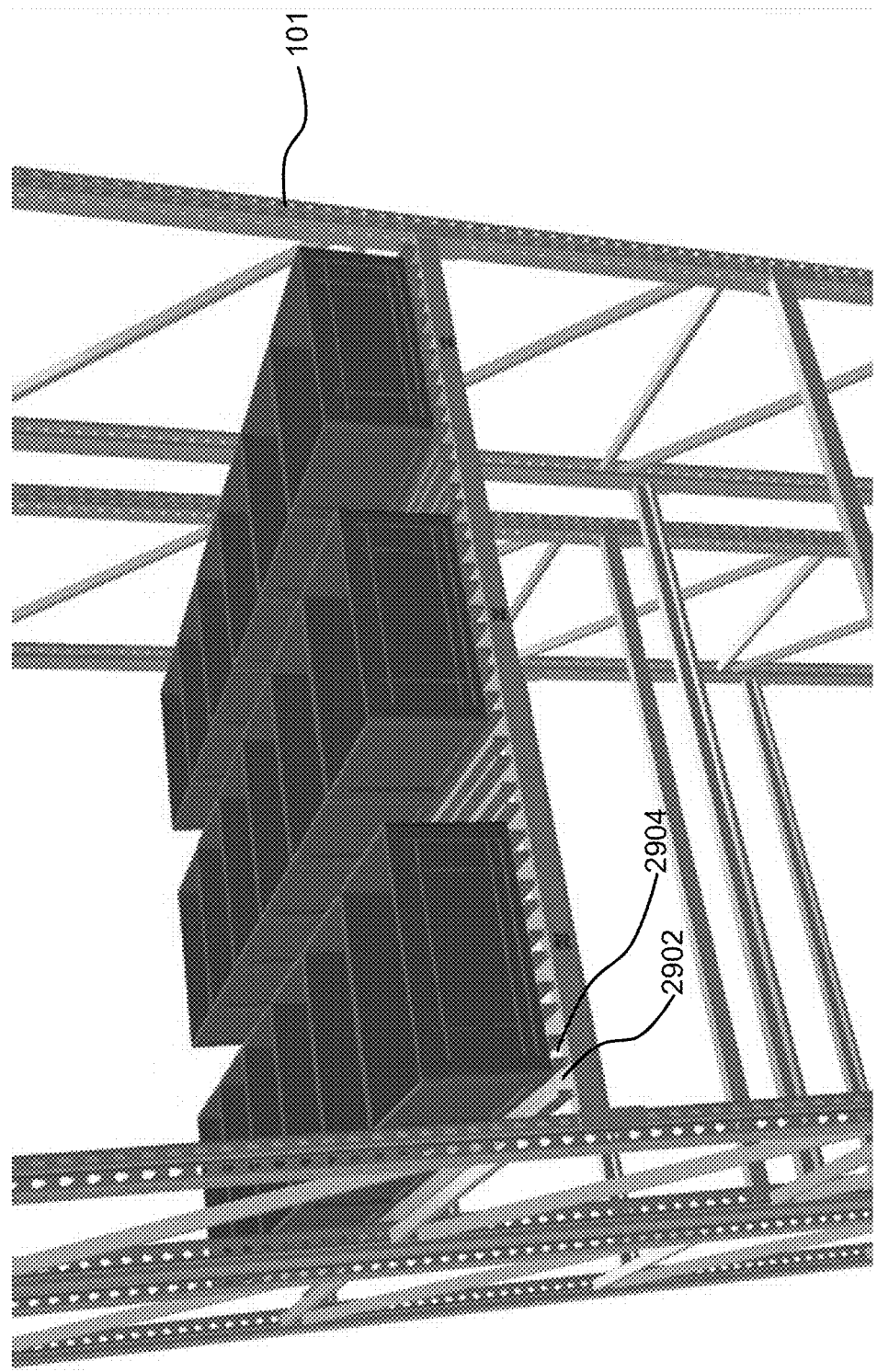
FIG. 29 depicts an example storage rack with corrugated decking.

FIG. 29 illustrates an example storage rack 101 with corrugated decking 2902. It should be noted that the modularized storage system described herein is configured to work with conventional storage racking systems and there is no need for custom rack storage, thus reducing cost to the storage facility. In some embodiments, as shown in the example of FIG. 29, the corrugated decking may be realized by installing a plurality of tracks, such as track 2902, at specified intervals to accommodate the wheels of a handling vehicle. Additionally, using tracks to create the corrugated decking allows for spaces, such as space 2904, between the tracks. These spaces allow vision systems included in the load handling platform 108 and/or the load handling device 2514 to identify objects stored within storage racking 101. For example, QR codes, barcodes, or other identifying marks on objects in storage racking 101 may be aligned with the spaces such that vision systems of the load handling platform 108 and/or load handling device 2514 may identify the objects. In other embodiments, load handling platform 108 and/or load handling device 2514 may use image processing to identify objects and their locations without identifying marks.

Figure 30:
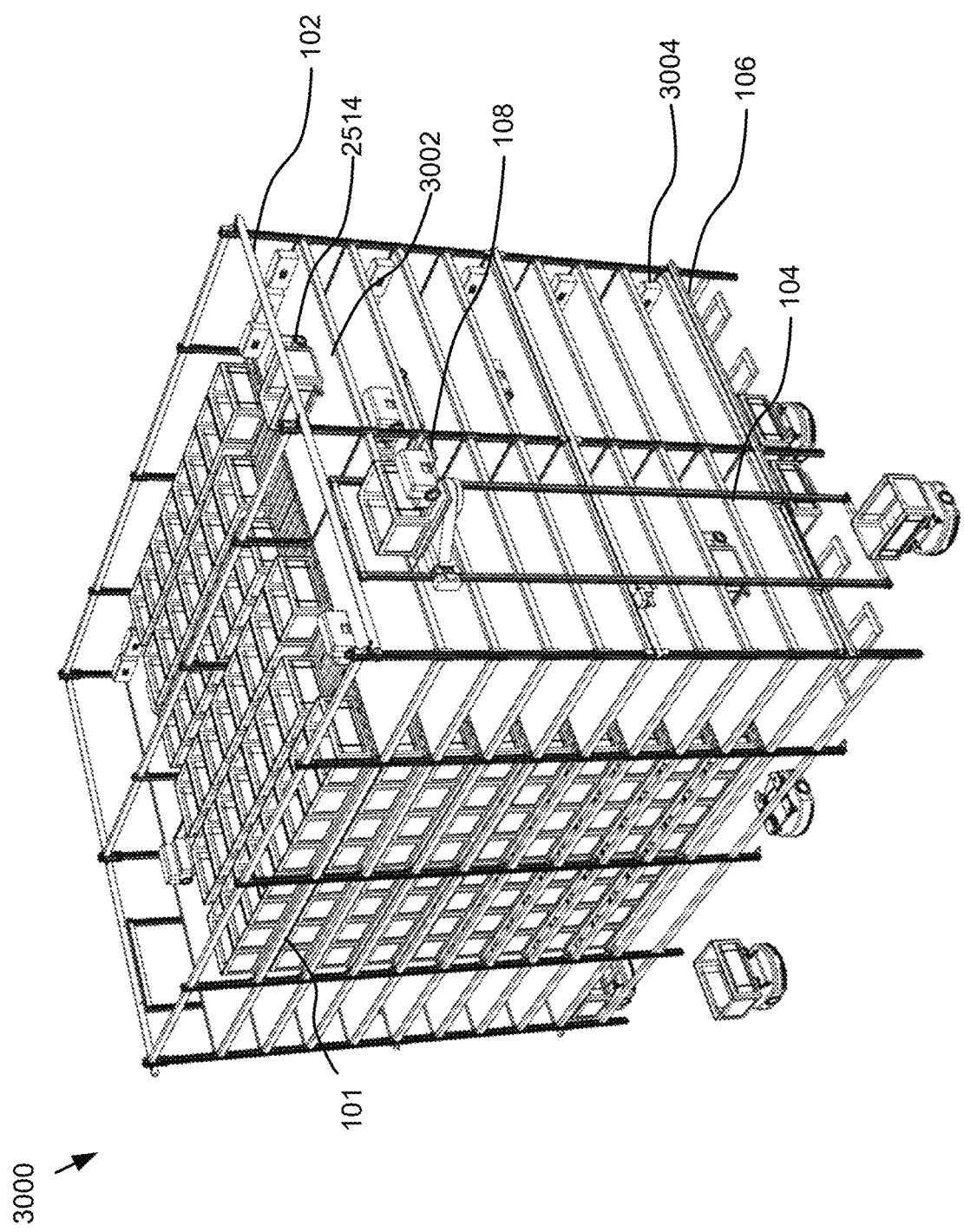
FIG. 30 depicts another example embodiment of a modularized storage system.

FIG. 30 illustrates another embodiment of a modularized storage system 3000. In the example of FIG. 30, the modularized storage system 3000 includes work bays, such as work bay 3002, where multiple load handling devices, such as load handling device 2514, may work to stage and retrieve objects from storage racking 101. The addition of work bays in the modularized storage system 3000 allows the handling vehicles to shuffle objects within storage racking 101 without having to utilize the load handling platform 108 to navigate off of the current level of storage racking 101 to access objects deeper in storage racking 101. This configuration provides additional efficiencies in accessing objects in storage racking 101. As shown in the example of FIG. 30, upper horizontal guide rail 102 and lower horizontal guide rail 106 may be mounted on the storage rack 101 adjacent to the work bays such that vertical guide rail assembly 104 and load handling platform 108 may access the work bays. Work bays may include charging stations, such as charging station 3004, where load handling device 2514 can charge onboard batteries.

Figure 31:
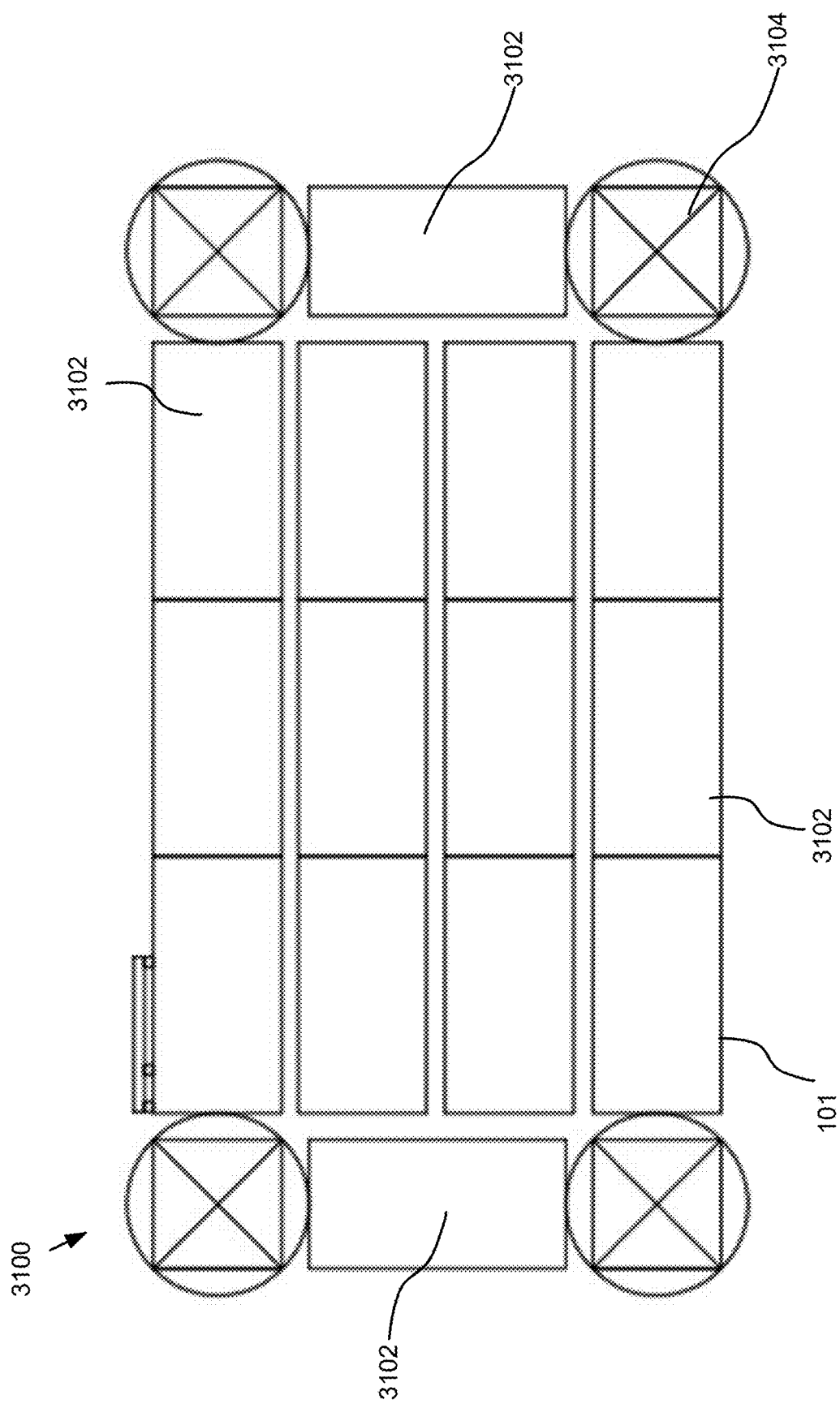
FIG. 31 depicts an overhead view of another example embodiment of a modularized storage system.

FIG. 31 is an overhead view of another embodiment of a modularized storage system 3100. In the example of FIG. 31, work bays 3102 may be located on all sides of storage racking 101 and load handling devices can access objects from any direction within the storage rack. In one embodiment, horizontal and vertical rails with vehicle platforms may be installed on one or more sides of storage racking 101. However, it may be cost prohibitive to have multiple vehicle platforms servicing a single storage cube. In other embodiments, horizontal guide rails may be installed on all sides of the storage rack and detachable, rotating corner sections 3104 provide for transitions of the vertical guide rail assembly from side to side of the storage rack.

Figure 32:
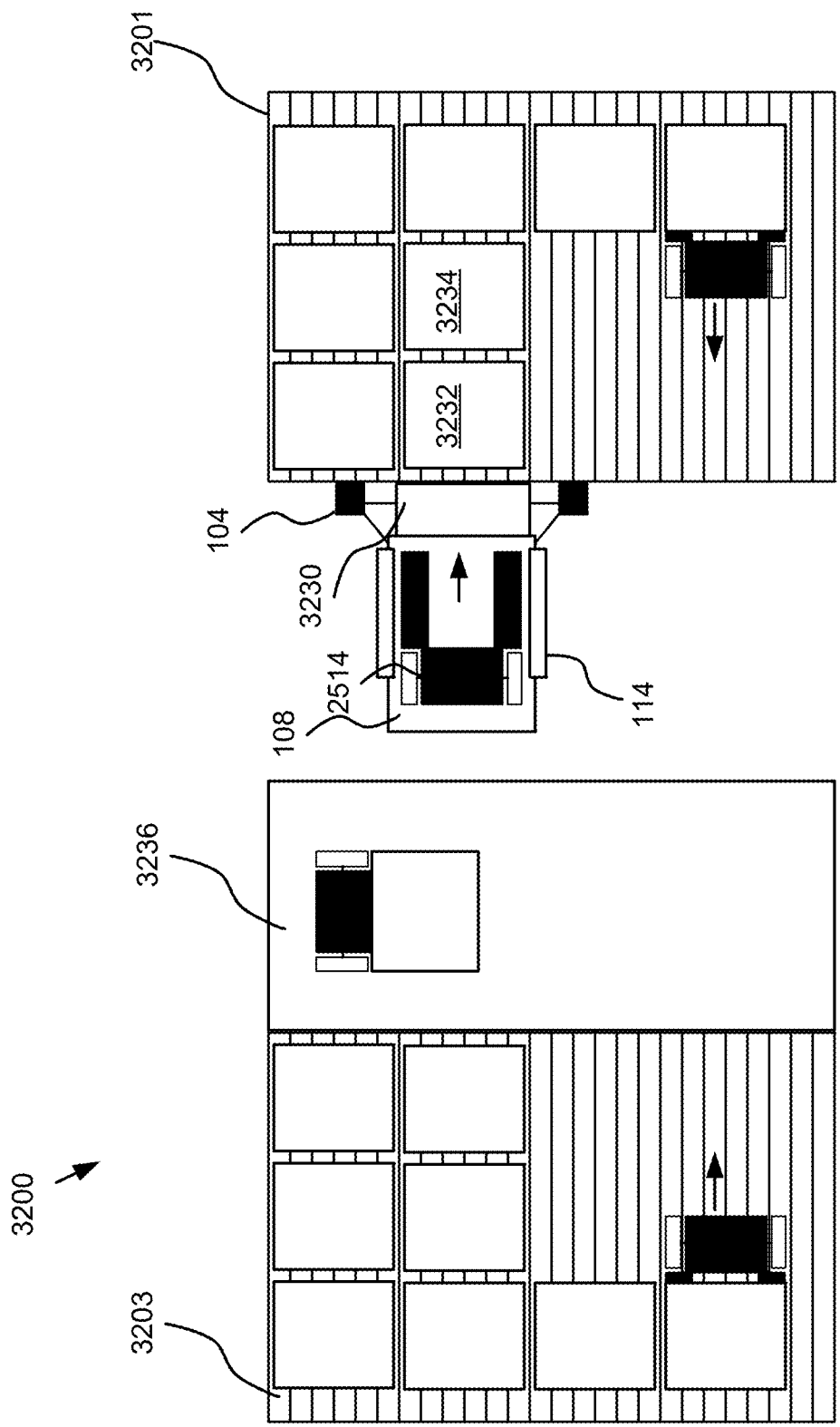
FIG. 32 is an overhead view of another embodiment of a modularized storage system.

FIG. 32 is an overhead view of another embodiment of a modularized storage system 3200. In the example of FIG. 32, multiple storage racks, for example storage rack 3201 and 3203, may be serviced by a single load handling platform 108 and vertical guide rail assembly 104 coupled with storage rack 3201. Load handling platform 108 may include a retractable ramp 3230 configured to allow load handling device 2514 to drive from load handling platform 108 onto a storage rack. While a single retractable ramp 3230 is shown in the example of FIG. 32, it should be understood that a split platform (one for each wheel of load handling device 2514) may be employed. With the retractable ramp 3230 retracted, load handling platform 108 is free to rotate in all directions to access storage rack 3203. For example, load handling platform 108 may rotate 180 degrees and extend retractable ramp 3230 so that load handling device 2514 may access storage rack 3203.

In some embodiments, load handling platform 108 may include a load handling device 114, such as the handling device described above, in addition to being a platform to carry load handling device 2514. Load handling device 114 may be configured to manipulate objects, such as objects 3232 and 3234, independent of load handling device 2514.

As described above storage racks may include a work bay, such as work bay 3236, to allow a handling vehicle to move objects around the storage rack. The handling vehicles described herein are configured to travel on a flat surface and the wheels can operate independently so that the handling vehicle can travel in any direction in a work bay as well as navigate in the tracks of the corrugated decking as described above.

The foregoing description, for purpose of explanation, has been described with reference to various embodiments and examples. However, the illustrative discussions above are not intended to be exhaustive or to limit the invention to the precise forms disclosed. Many modifications and variations are possible in view of the above teachings. The various embodiments and examples were chosen and described in order to best explain the principles of the invention and its practical applications, to thereby enable others skilled in the art to utilize the innovative technology with various modifications as may be suited to the particular use contemplated. For instance, it should be understood that the technology described herein can be practiced without these specific details in some cases. Further, various systems, devices, and structures are shown in block diagram form in order to avoid obscuring the description. For instance, various implementations are described as having particular hardware, software, and user interfaces.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A load handling system for storage racking, the load handling system comprising:
    a first bracket assembly configured to couple a first horizontal guide rail with the storage racking, wherein the first bracket assembly comprises:
        a first racking column adapter having a first column connection portion, wherein the first column connection portion is configured to attach to a column of the storage racking, and a first support member extending substantially perpendicularly from the first column connection portion; and
        a first horizontal guide rail support device coupled with the first support member, wherein the first horizontal guide rail support device is configured to secure the first horizontal guide rail;
    a second bracket assembly configured to couple a second horizontal guide rail with the storage racking, wherein the second bracket assembly comprises:
        a second racking column adapter configured to attach to the column of the storage racking; and
        a second horizontal guide rail support device coupled with the second racking column adapter, wherein the second horizontal guide rail support device is configured to secure the second horizontal guide rail;
    a vertical guide rail assembly coupled with the first horizontal guide rail and the second horizontal guide rail, wherein the vertical guide rail assembly is configured to be moved horizontally along the first horizontal guide rail and the second horizontal guide rail by a first motor; and
    a load handling platform coupled with the vertical guide rail assembly, wherein the load handling platform is configured to be moved vertically along the vertical guide rail assembly by a second motor.

2. The load handling system of claim 1, wherein the first horizontal guide rail support device comprises:
    a guide rail support plate coupled with the first support member; and
    a plurality of pressure plates coupled with the guide rail support plate;
    wherein the first horizontal guide rail is configured to be secured between the guide rail support plate and the plurality of pressure plates.

3. The load handling system of claim 2, wherein the guide rail support plate is further configured to support a first gear rack, wherein a first pinion gear coupled with the first motor is configured to interface with the first gear rack to move the vertical guide rail assembly horizontally along the first horizontal guide rail.

4. The load handling system of claim 1, wherein the first bracket assembly is configured to enable adjustment of an angle of the first support member with respect to the column of the storage racking to account for variability in columns of the storage racking.

5. The load handling system of claim 1, wherein the second bracket assembly is configured to enable adjustment of an angle of the second horizontal guide rail support device with respect to the column of the storage racking to account for variability in columns of the storage racking.

6. The load handling system of claim 1, wherein the first bracket assembly is configured to enable adjustment of a distance between the column of the storage racking and the first horizontal guide rail support device to account for variability in columns of the storage racking.

7. The load handling system of claim 1, wherein the second bracket assembly is configured to enable adjustment of a distance between the column of the storage racking and the second horizontal guide rail support device to account for variability in columns of the storage racking.

8. A load handling system for storage racking, the load handling system comprising:
    a plurality of adjustable bracket assemblies coupled with a column of the storage racking, each adjustable bracket assembly of the plurality of adjustable bracket assemblies comprising:

a column adapter extending substantially perpendicularly from the column of the storage racking; and
a horizontal guide rail support coupled with the column adapter;
a plurality of horizontal guide rails coupled with the plurality of horizontal guide rail supports;
a vertical guide rail assembly slidably coupled with the plurality of horizontal guide rails, wherein the vertical guide rail assembly is motorized to move horizontally along the plurality of horizontal guide rails;
a load handling platform slidably coupled with the vertical guide rail assembly, wherein the load handling platform is motorized to move vertically along the vertical guide rail assembly; and
a load handling device, wherein the load handling platform is configured to deliver the load handling device to manipulate a load located in the storage racking.

9. The load handling system of claim 8, wherein the plurality of adjustable bracket assemblies are configured to enable adjustment of yaw, pitch, and roll of the plurality of adjustable bracket assemblies such that the plurality of horizontal guide rails are level and straight regardless of variability in column position of the storage racking.

10. The load handling system of claim 8, wherein the plurality of adjustable bracket assemblies include:
an adjustable upper bracket assembly coupled with the column of the storage racking; and
an adjustable lower bracket assembly coupled with the column of the storage racking.

11. The load handling system of claim 10, wherein the adjustable upper bracket assembly comprises:
an adjustable column adapter comprising:
a column connection portion, wherein the column connection portion is configured to adjustably attach to the column of the storage racking; and
a support member extending substantially perpendicularly from the column connection portion; and
a horizontal guide rail support device coupled with the support member, wherein the horizontal guide rail support device is configured to adjustably secure a horizontal guide rail.

12. The load handling system of claim 11, wherein the horizontal guide rail support device comprises:
a guide rail support plate coupled with the support member; and
a plurality of pressure plates coupled with the guide rail support plate, wherein the horizontal guide rail is configured to be secured between the guide rail support plate and the plurality of pressure plates.

13. The load handling system of claim 12, wherein the guide rail support plate is further configured to support a gear rack, wherein the gear rack is configured to interface with a motor of the vertical guide rail assembly to move the vertical guide rail assembly horizontally along the horizontal guide rail.

14. The load handling system of claim 10, wherein the adjustable lower bracket assembly comprises:
an adjustable column adapter configured to adjustably attach to the column of the storage racking; and
an adjustable horizontal guide rail support coupled with a distal end of the adjustable column adapter, wherein the horizontal guide rail support is configured to support a horizontal guide rail.

15. The load handling system of claim 14, wherein the horizontal guide rail comprises a gear rack, wherein the gear rack is configured to interface with a motor of the vertical guide rail assembly to move the vertical guide rail assembly horizontally along the horizontal guide rail.

16. A load handling system for storage racking, the load handling system comprising:
means for adjustably coupling an upper horizontal guide rail with the storage racking;
means for adjustably coupling a lower horizontal guide rail with the storage racking;
a vertical guide rail assembly slidably coupled with the upper horizontal guide rail and the lower horizontal guide rail, wherein the vertical guide rail assembly is motorized to move horizontally along the upper horizontal guide rail and the lower horizontal guide rail;
a load handling platform slidably coupled with the vertical guide rail assembly, wherein the load handling platform is motorized to move vertically along the vertical guide rail assembly; and
load handling means, wherein the load handling platform is configured to deliver the load handling means to manipulate a load located in the storage racking.

17. The load handling system of claim 16, wherein the means for adjustably coupling the upper horizontal guide rail with the storage racking is configured to enable adjustment of pitch, yaw, and roll such that the upper horizontal guide rail are level and straight regardless of variability in column position of the storage racking.

18. The load handling system of claim 16, wherein the means for adjustably coupling the lower horizontal guide rail with the storage racking is configured to enable adjustment of pitch, yaw, and roll such that the lower horizontal guide rail are level and straight regardless of variability in column position of the storage racking.

19. The load handling system of claim 16, wherein the means for adjustably coupling the upper horizontal guide rail with the storage racking is configured to enable adjustment of a distance between the storage racking and the upper horizontal guide rail to account for variability in columns of the storage racking.

20. The load handling system of claim 16, wherein the means for adjustably coupling the lower horizontal guide rail with the storage racking is configured to enable adjustment of a distance between the storage racking and the lower horizontal guide rail to account for variability in columns of the storage racking.

* * * * *